(12) United States Patent
Maru et al.

(10) Patent No.: US 7,258,412 B2
(45) Date of Patent: Aug. 21, 2007

(54) INK-JET PRINTING METHOD, APPARATUS AND SYSTEM

(75) Inventors: Akiko Maru, Kanagawa (JP); Hiroshi Tajika, Kanagawa (JP); Hitoshi Nishikori, Tokyo (JP); Daisaku Ide, Tokyo (JP); Takeshi Yazawa, Kanagawa (JP); Atsuhiko Masuyama, Tokyo (JP); Hirokazu Yoshikawa, Kanagawa (JP); Hideaki Takamiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 389 days.

(21) Appl. No.: 10/912,191

(22) Filed: Aug. 6, 2004

(65) Prior Publication Data

US 2005/0035996 A1 Feb. 17, 2005

(30) Foreign Application Priority Data

Aug. 11, 2003 (JP) .............................. 2003-291875

(51) Int. Cl.
*B41J 2/205* (2006.01)
(52) U.S. Cl. .................... 347/15; 358/1.9; 358/3.01
(58) Field of Classification Search ................ 347/15, 347/43, 1.2; 358/1.9, 3.06, 1.2, 3.01, 3.23, 358/525, 3.21
See application file for complete search history.

(56) References Cited

U.S. PATENT DOCUMENTS

| 5,825,377 | A | 10/1998 | Gotoh et al. |
|---|---|---|---|
| 6,120,129 | A | 9/2000 | Iwasaki et al. |
| 6,158,836 | A | 12/2000 | Iwasaki et al. |
| 6,203,133 | B1 | 3/2001 | Tanaka et al. |
| 6,244,681 | B1 | 6/2001 | Yano et al. |
| 6,260,938 | B1 | 7/2001 | Ohtsuka et al. |
| 6,315,391 | B1 * | 11/2001 | Kanematsu .................. 347/43 |
| 6,390,586 | B1 | 5/2002 | Takahashi et al. |
| 6,543,872 | B2 | 4/2003 | Ohtsuka et al. |
| 6,557,964 | B2 | 5/2003 | Kawatoko et al. |
| 6,738,160 | B1 | 5/2004 | Kato et al. |
| 2002/0105557 | A1 | 8/2002 | Teshigawara et al. |
| 2003/0030824 | A1 | 2/2003 | Ogasahara et al. |
| 2004/0041868 | A1 | 3/2004 | Maru et al. |
| 2004/0041882 | A1 | 3/2004 | Konno et al. |

FOREIGN PATENT DOCUMENTS

| EP | 0 970 815 | 1/2000 |
|---|---|---|
| EP | 1 003 124 | 5/2000 |
| EP | 1 072 421 | 1/2001 |

(Continued)

*Primary Examiner*—Lamson Nguyen
(74) *Attorney, Agent, or Firm*—Fitzpatrick, Cella, Harper & Scinto

(57) ABSTRACT

An ink-jet printing method, an ink-jet printing apparatus and an ink-jet printing system, which are free from the deterioration of color development effect even if a plurality of color inks are used, caused by the overlap of different color inks on a printing medium, are proposed. For this purpose, when density data quantized to several ranks are converted finally to binary data by using predetermined dot arrangement patterns, a dot arrangement pattern different from those for other color inks is prepared for a particular color ink. Accordingly, it is possible to reduce as much as possible the probability that the particular color ink is overlapped with the other inks on the printing medium, whereby the color development of the particular color ink is effectively facilitated.

16 Claims, 16 Drawing Sheets

FOREIGN PATENT DOCUMENTS

| | | |
|---|---|---|
| EP | 1 079 327 | 2/2001 |
| JP | 9-46522 | 2/1997 |
| JP | 2000-127459 | 5/2000 |
| JP | 2000-141617 | 5/2000 |
| JP | 2001-315319 | 11/2001 |
| JP | 2002-29097 | 1/2002 |
| JP | 2003-39711 | 2/2003 |

* cited by examiner

FIG.2

| R | | | |
|---|---|---|---|
| d | h | ⓖ | a |
| c | ⓖ | e | d |
| ⓑ | f | ⓑ | f |
| a | e | c | h |

FIG.5A

| M,LM | | | |
|---|---|---|---|
| e | f | d | e |
| d | a | f | h |
| b | g | b | a |
| h | c | g | c |

FIG.5B

| Y,K | | | |
|---|---|---|---|
| a | f | g | c |
| d | g | h | b |
| h | c | a | e |
| b | e | h | d |

| a | b | c | d |
|---|---|---|---|
| d | a | b | c |
| c | d | a | b |
| b | c | d | a |

SHIFTING AMOUNT: +1 IN THE RIGHT DIRECTION

FIG.6B

| a | b | c | d |
|---|---|---|---|
| c | d | a | b |
| a | b | c | d |
| c | d | a | b |

SHIFTING AMOUNT: +2 IN THE RIGHT DIRECTION

FIG.6C

| a | b | c | d |
|---|---|---|---|
| b | c | d | a |
| c | d | a | b |
| d | a | b | c |

SHIFTING AMOUNT: -2 IN THE RIGHT DIRECTION (+1 IN THE LEFT DIRECTION)

|   |   |   |   |
|---|---|---|---|
| c | d | a | b |
| b | c | d | a |
| a | b | c | d |
| d | a | b | c |

FIG.7

| a | b | c | d | e |
|---|---|---|---|---|
| e | a | b | c | d |
| d | e | a | b | c |
| c | d | e | a | b |
| b | c | d | e | a |

FIG.8

INK-JET PRINTING METHOD, APPARATUS AND SYSTEM

BACKGROUND OF THE INVENTION

1. Field of the Invention

The present invention relates to an ink-jet printing method, an apparatus and a system for printing an image by a plurality of inks including particular color, inks

2. Description of the Related Art

Recently, as an information processing device such as a personal computer or other apparatus has become prevalent, a printing apparatus which is a terminal device for forming an image has also been rapidly developed and become prevalent. Of various printing apparatuses, an inkjet printing apparatus for printing records on a printing medium such as paper, cloth, plastic sheet or OHP sheet by ejecting ink from orifices is in a main trend of personal users since it has extremely excellent features; for example, it employs a non-impact type low-noise printing system, it is capable of carrying out a high-density and high speed printing operation, it is easily applicable to a color printing and the cost thereof is reasonable.

The progress of the ink-jet printing technology facilitates the high image quality, high operational speed and decreased cost of printing, and largely contributes to the extension of the printing apparatus into personal users in association with the extension of personal computers or digital cameras (those performing the function by themselves as well as those integral with other devices such as portable type telephones). Thus, the further improvement in image quality has been required from the personal users as the ink-jet printing apparatus has become prevalent in such a manner. Recently, a printing system capable of easily printing a photograph in a home and an image grade corresponding to a silver film photograph has been demanded.

When comparing the image formed by the ink-jet printing apparatus with the silver film photograph, the former has been problematic in a peculiar granular feeling. Accordingly, various countermeasures have been recently proposed for reducing the granular feeling, and there have been also various printing apparatuses applying such countermeasures. For example, there is an ink-jet printing apparatus having an ink system including not only normal cyan, magenta, yellow and black inks but also light cyan or light magenta ink having a lower density. According to such an ink system, it is possible to reduce the granular feeling by using light cyan or light magenta in a lower optical density area. Also, it is possible to realize the wider color regeneration and smoother gradation by using the normal cyan and magenta in a higher density area.

Further, there is also a method in which a size of ink dot on a recording medium is designed to be smaller to reduce the granular feeling of the image. To realize this, a technology has also been developed for lessening an amount of ink droplet ejected from the respective printing element arranged in a printing head. In this case, it is possible to obtain a high-resolution image without decelerating the printing speed by lessening the amount of ink droplet as well as arranging more recording elements at a higher density.

Furthermore, for the purpose of obtaining a high image quality as good as or exceeding that of the silver film photograph, a printing apparatus has been proposed in which an image is printed by the addition of novel ink colors such as red (R), green (G) or blue (B) to enlarge a gamut in which the image is represented. These R, G and B colors are referred to as secondary colors originally representable by overlapping the primary colors, cyan, magenta and yellow, with each other. However, in practice, there is a tendency to decrease the mutual color development effect in a stage of overlapping these primary colors with each other on the printing medium. It has generally been known that the image having the better color development is obtained when the secondary colors are printed as single colors. Hereinafter, the ink used while laying a stress on the color development on the printing medium, such as red, green or blue, is defined as a particular color ink.

In this regard, many methods of a so-called binary digitization processing have been proposed or disclosed, for converting multi-gradation data representing the density of the printed image to binary data determining whether or not the ink droplet is printed on the printing medium, and it is basically possible to adopt any of them. However, under the circumstances wherein kinds of ink color increases or printer resolution is higher, there may be a case wherein the binary digitization processing of all colors could hardly be carried out by one means in one process. Accordingly, printing apparatuses for carrying out a two-stage binary digitization processing have been recently provided, in which, after the quantization process for reducing the gradation levels to several levels by a printer driver installed in a host apparatus connected to the printing apparatus, the final quantization processing is carried out within the printing apparatus. In this case, since the gradation of one pixel output from the host apparatus is represented by a plurality of density levels, this method is suitable for a use laying a stress on the gradation as in the photographic image quality.

Several methods have already been proposed and carried out for converting multi-density data of several levels to binary data. For example, in Japanese Patent Application Laid-open No. 9-046522 (1997), a method is disclosed, in which one input pixel having a gradation value of five levels is represented by the printing or non-printing of four dots in a 2×2 area. Further, according to this document, a plurality of patterns of the dot arrangement in the 2×2 areas are prepared for the same gradation value, and sequentially or randomly arranged. Since the dot arrangement pattern to the respective gradation value is not fixed, a so-called sweeping phenomenon, false contour appearing in an edge portion of the image or others occurs when the pseudo-intermediate tone processing is carried out. Also, it has been described that there is an effect for averaging the use of a plurality of printing elements arranged in a printing head.

Further, a conversion method is also proposed for improving the above technology as the printing apparatus is developed to be more precise. For example, according to Japanese Patent Application Laid-open No. 2002-029097, printing apparatuses are disclosed, in which a printing head having two rows of printing elements, each row being different in properties from the other while ejecting ink droplets of the same color, or a method is adopted for switching printing or non-printing in every columns to shorten the printing times (a column-thinning method). And, a method for periodically changing a method of cyclic arrangement of some dot-arrangement patterns to solve the respective trouble, while preparing a plurality of dot-arrangement patterns, each having the same gradation level but different in dot arrangement from the other.

The conventional method for converting the multi-level density data to binary data typically described in the above patent documents is effective for overcoming various troubles occurring when the printing is carried out by using a monochrome ink, but there is no consideration for solving peculiar problems occurring when multicolor inks are used.

As described in BACKGROUND OF THE INVENTION, in general, when inks of different colors are overlapped with each other, a phenomenon occurs that the color development is disturbed in the respective ink. When the multicolor inks are used at the same time as in a recent case, a probability becomes higher in that different colors are overlapped with each other. Particularly, it is true to the particular color inks added to facilitate the color-development and this results in a serious problem to deny the existence thereof.

SUMMARY OF THE INVENTION

The present invention has been made to solve the above-mentioned problems, and an object thereof is to provide an ink-jet printing method, an ink-jet printing apparatus and ink-jet printing system free from troubles for reducing the color development effect due to the overlap of different color inks, even if a plurality color of inks including particular color inks are used for the printing.

In this specification, a particular color is defined in a broad sense as a color different in hue from yellow, magenta and cyan which are printing agents of basic colors. In a narrow sense, the particular color is defined as a color capable of representing at least one of higher lightness and chroma in a CIE-L*a*b* color space than in a color reproduction area represented on the printing medium by the combination of any two basic color printing agents, magenta, yellow and cyan, as well as a color representing a hue angle in the color reproduction area represented by the above-mentioned combination of any two printing agents.

In the present invention, while the particular color printing agent in the above-mentioned narrow sense is preferably used, the particular color printing agent in a wide sense may be used.

In the first aspect of the present invention, there is provided an ink-jet printing method for forming a color image on a printing medium by using a printing head for ejecting a plurality of color inks including inks for basic colors including magenta, yellow and cyan and an ink of particular color exhibiting a hue different from that of the basic colors, comprising the steps of: allocating a dot arrangement pattern to each of pixels in correspondence to a level of the pixel; the pixels being represented by multi-value levels, and ejecting the ink from the printing head to the printing medium based on the dot arrangement pattern allocated to the respective pixel, wherein for the particular color ink, the dot arrangement pattern different from those for at least one color ink other than the particular color ink is allocated.

In the second aspect of the present invention, there is provided an ink-jet printing method for forming a color image on a printing medium by using particular color ink and basic color inks, the particular color ink being capable of representing a lightness higher than in a color regeneration area represented by the combination of two inks in the basic color inks of magenta, yellow and cyan and having a hue angle in the color regeneration area represented by the combination of the two inks, comprising the steps of: allocating a dot arrangement pattern to each of pixels in correspondence to a level of the pixel; the pixels being represented by multi-value levels, and ejecting the ink from the printing head to the printing medium based on the dot arrangement pattern allocated to the respective pixel, wherein the dot arrangement pattern different from that for at least one color ink other than the particular color ink is used for the particular color ink in the allocation process.

In the third aspect of the present invention, there is provided an ink-jet printing method for forming a color image on a printing medium by using a printing head for ejecting a plurality of color inks including inks for basic colors including magenta, yellow and cyan and an ink for particular color exhibiting a hue different from that of the basic colors, comprising the steps of: first quantizing for converting multi-value density data to those at a lower level, second quantizing for converting the density data obtained by the first quantizing to binary data by using a dot arrangement pattern corresponding to the data value of the density data, and ejecting the ink to the printing medium from the printing head in accordance with the binary data obtained by the second quantizing; wherein in the second quantizing, the dot arrangement pattern different from those for at least one color ink other than the particular color ink is used for particular color ink.

In the fourth aspect of the present invention, there is provided an ink-jet printing apparatus for forming a color image on a printing medium by using a printing head for ejecting a plurality of color inks including inks for basic colors including magenta, yellow and cyan and an ink for particular color exhibiting a hue different from that of the basic colors, comprising: means for allocating a dot arrangement pattern to each of pixels represented by multi-value levels, in correspondence to the level of the respective pixel, and means for ejecting ink from the printing head to the printing medium based on the dot arrangement pattern allocated to the respective pixel, wherein the allocation means allocates the dot arrangement pattern for particular color ink, different from those for at least one color ink other than the particular color ink.

In the fifth aspect of the present invention, there is provided an ink-jet printing system for forming a color image on a printing medium by using a printing head for ejecting a plurality of color inks including inks for basic colors including magenta, yellow and cyan and an ink for particular color exhibiting a hue different from that of the basic colors, comprising: first quantization means for converting multi-value density data to those at a lower level, second quantization means for converting the density data obtained by the first quantizing to binary data by using a dot arrangement pattern corresponding to the data value of the density data, and means for ejecting the ink to the printing medium from the printing head in accordance with the binary data obtained by the second quantization means; wherein in the second quantization means, the dot arrangement pattern different from those for at least one color ink other than the particular color ink is used the particular color ink.

In the sixth aspect of the present invention there is provided an ink-jet printing method for forming a color image on a printing medium by using a printing head for ejecting a plurality of color inks including inks for basic colors including magenta, yellow and cyan and an ink for particular color exhibiting a hue different from that of the basic colors, comprising the steps of: allocating one of a plurality of different dot arrangement patterns corresponding to the same level to each of pixels in predetermined order or randomly; the pixels being represented by multi-value levels, and ejecting the ink from the printing head to the printing medium based on the dot arrangement pattern allocated to the respective pixel, wherein an allocation order of the plurality of different dot arrangement patterns, for the particular color ink, in the allocating is different from that for at least one color ink other than the particular color ink.

In the seventh aspect of the present invention, there is provided an ink-jet printing method for forming a color image on a printing medium by using a printing head for ejecting a plurality of color inks including ink for basic colors including magenta, yellow and cyan and an ink for particular color exhibiting a hue different from that of the basic colors, comprising the steps of: first quantizing for converting multi-value density data to those in a lower level, second quantizing for converting the density data obtained by the first quantizing to binary data by using a dot arrangement pattern corresponding to the data value of the density data, and ejecting ink from the printing head to the printing medium in accordance with the binary data obtained by the second quantizing, wherein, in the second quantizing, a plurality of the dot arrangement patterns different from each other are used for the same value obtained by the first quantizing in accordance with a predetermined arrangement rule, and one arrangement rule used for the particular color ink is different from that for at least one color ink other than the particular color ink.

In the eighth aspect of the present invention, there is provided an ink-jet printing method for printing a color image on a printing medium by using a printing head for ejecting a plurality of color inks including basic color inks of magenta, yellow and cyan and particular color ink exhibiting a hue different from that of the basic color inks, comprising the steps of: selecting one dot arrangement pattern from a matrix formed by arranging a plurality of different dot arrangement patterns corresponding to the same level and allocating the selected dot arrangement pattern to a pixel represented by multi-value levels, and ejecting the ink from the printing head to the printing medium based on the dot arrangement pattern allocated to the respective pixel, wherein the arrangement of the dot arrangement patterns in the matrix for the particular color ink is different from the arrangement of the dot arrangement patterns in the matrix for at least one color ink other than the particular color ink.

In the ninth aspect of the present invention, there is provided an ink-jet printing apparatus for forming a color image on a printing medium by using a printing head for ejecting a plurality of color inks including particular color ink, comprising an allocation means for allocating one of a plurality of different dot arrangement patterns corresponding to the same level to each of pixels in predetermined order or randomly; the pixels being represented by multi-value levels, and means for ejecting the ink from the printing head to the printing medium based on the dot arrangement pattern allocated to the respective pixel, wherein the allocation order of the plurality of different dot arrangement patterns for particular color ink is different from that for at least one color ink other than the particular color ink.

In the tenth aspect of the present invention, there is provided an ink-jet printing apparatus for forming a color image on a printing medium by using a printing head for ejecting a plurality of color inks including basic color inks of magenta, yellow and cyan and particular color ink exhibiting a hue different from that of the basic color inks, comprising: means for selecting one dot arrangement pattern from a matrix formed by arranging a plurality of different dot arrangement patterns corresponding to the same level and allocating the selected dot arrangement pattern to a pixel represented by multi-value levels, and means for ejecting the ink from the printing head to the printing medium based on the dot arrangement pattern allocated to the respective pixel, wherein the arrangement of the dot arrangement patterns in the matrix for the special color ink is different from the arrangement of the dot arrangement patterns in the matrix for at least one color ink other than the special ink.

The above and other objects, effects, features and advantages of the present invention will become more apparent from the following description of embodiments thereof taken in conjunction with the accompanying drawings.

BRIEF DESCRIPTION OF THE DRAWINGS

FIG. 2 illustrates dot arrangement patterns for levels 0 to 8 in a first embodiment of the present invention;

FIGS. 5A to 5C illustrate dot arrangement patterns on a recording medium applied to the second embodiment of the present invention;

FIGS. 6A to 6C illustrate examples of the arrangement using four dot arrangement patterns applicable to the second embodiment of the present invention;

FIG. 7 illustrates one example of the arrangement using four dot arrangement patterns applicable to the second embodiment of the present invention;

FIG. 8 illustrates one example of the arrangement using five dot arrangement patterns applicable to the second embodiment of the present invention;

DETAILED DESCRIPTION OF PREFERRED EMBODIMENTS

The embodiments of the present invention will be described below in more detail.

First Embodiment

Figure 1:
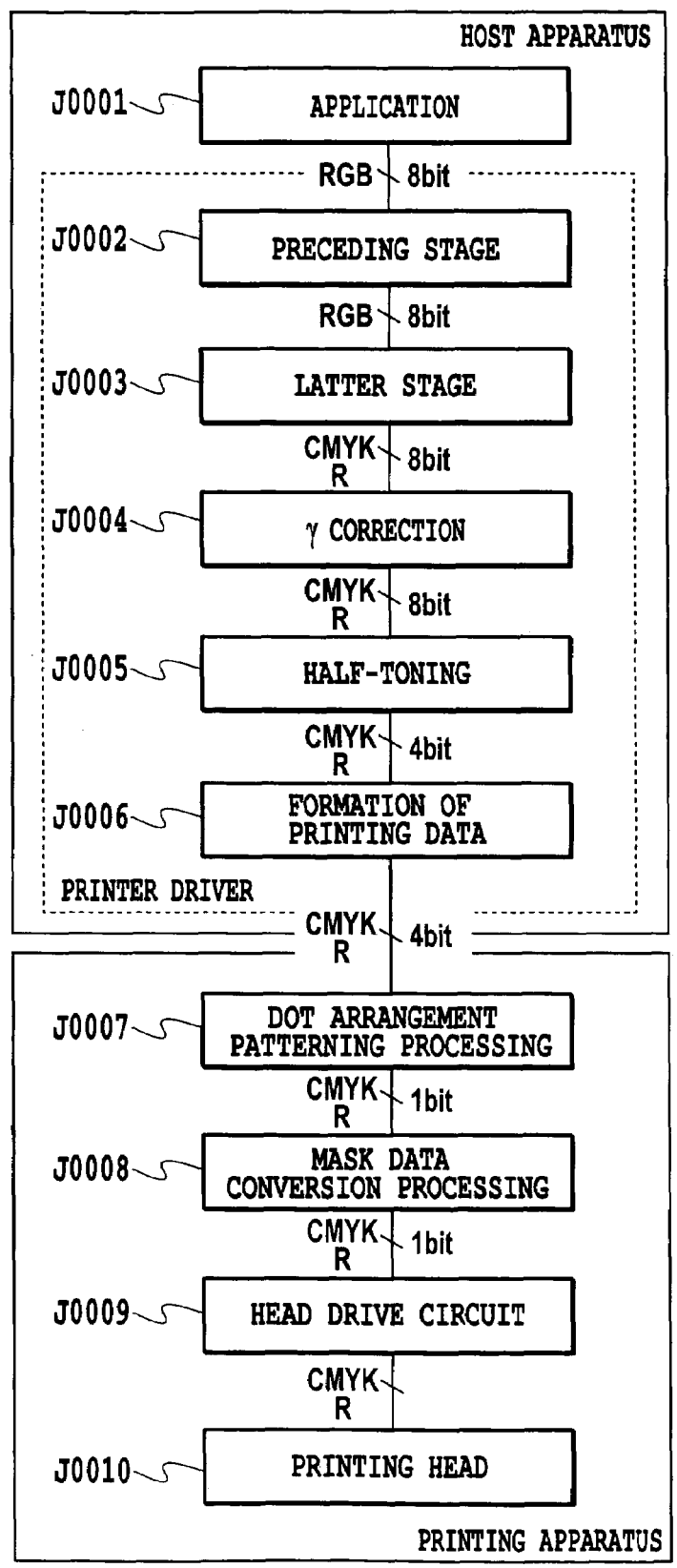
FIG. 1 is a block diagram for explaining a flow of image data conversion processing in a printing system applied to one aspect of the present invention.

FIG. 1 is a block diagram for explaining a flow of image data conversion processing in a printing system applied to this embodiment of the present invention. A printing apparatus applied to this embodiment carries out the printing operation with basic color inks, cyan (C), magenta (M) yellow (Y) and black (K), as well as particular color inks, light cyan (LC), light magenta (LM) and red (R). Accordingly, a printing head J0010 is prepared for ejecting these seven color inks. The respective processing shown in FIG. 1 is carried out in a printing apparatus or a personal computer (PC) as a host apparatus.

As a program operated by the operation system of the host apparatus, there are an application and printer driver. The application J0001 executes the processing for forming image data printed by the printing apparatus. In the actual printing, the image data formed by the application is transferred to the printer driver.

The printer driver executes a preceding stage processing J0002, a latter stage processing J0003, a γ-correction J0004, a half toning J0005 and a printing data formation J0006. The respective processing will be briefly explained below. In the preceding stage processing J0002 is a mapping of a gamut. This processing is a data conversion for mapping the gamut regenerated by image data R, G and B in the sRGB standard into a gamut regenerated by the printing apparatus. Concretely, 256 gradation data of f R, G and B, each represented by 8 bits, are converted to 8 bit data of R, G and B having different content by using the three dimensional LUT.

In the latter stage processing J0003, based on the R, G and B data mapped to the above-mentioned gamut, the color separation data Y, M, C, K, LC, LM and R are obtained corresponding to the combinations of inks regenerating the colors represented by the R, G and B data. In this processing, the interpolation calculation is also carried out by the three-dimensional LUT in the same manner as in the preceding stage processing.

In the γ-correction J0004, the conversion of density (gradation values) of color separation data in the respective color obtained by the latter stage processing J0003 is carried out. Concretely, the conversion is carried out so that the color separation data linearly correspond the gradation characteristic of the respective color ink in the printing apparatus by using the one-directional LUT.

In the half toning J0005, each of the 8-bit color separation data, Y, M, C, K, LC, LM and R, is converted to four-bit data by using the quantization processing. According to this embodiment, the 8-bit data of 256 gradations is converted to the 4-bit data of 9 gradations by using the error dispersion method for outputting multi-valued data. This 4-bit data is the gradation value information which becomes an index for showing the arrangement pattern in the dot arrangement patterning processing in the printing apparatus.

Finally, the printing data formation processing J0006 is finally carried out in the printer driver. In the printing data formation processing J0006, the printing image information containing the 4-bit index data is added with a printing control information to complete printing data.

The printing apparatus executes a dot arrangement patterning processing J0007 and a mask data conversion processing J0008 on the above-mentioned-printing data input thereto.

The dot arrangement patterning processing, which is the most characteristic part of the present invention and this embodiment, will be described below. In the half toning J0005, multi-levels (256 level) density information (8-bit data) is lowered to 9 level gradation information (4-bit data). However, the information actually capable of being recorded by the ink-jet printing apparatus of this embodiment is 2-bit information for determining whether or not the ink is printed. In the dot arrangement patterning processing J0007, the multi-value level of 0 to 8 is lowered to the 2-bit level for determining whether or not the dot exists. Concretely, the dot arrangement pattern corresponding to the gradation value (level 0 to 8) is allocated to the 4-bit data output from the half toning J0005. That is, the dot arrangement pattern is allocated to one pixel represented by the multi-value levels.

Figure 2:
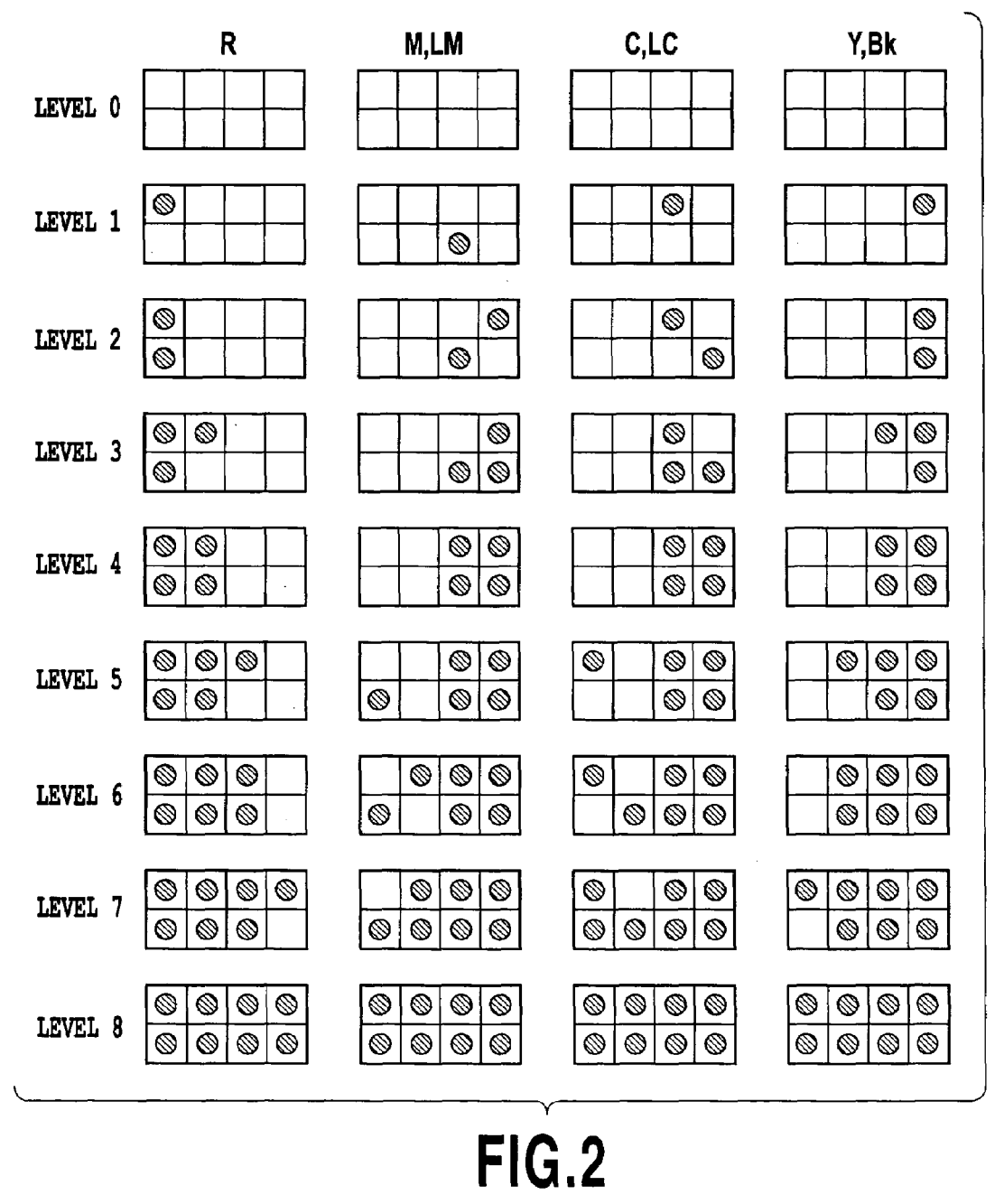

FIG. 2 illustrates dot arrangement patterns converted in correspondence to the levels 0 to 8, respectively. The levels shown on the left side of the drawings correspond to the levels 0 to 8 which are output values from the half tone processing section. Each of 2×4 areas arranged on the right side of the drawings corresponds to one pixel area output by the half tone processing section. The one pixel has a size corresponding to the pixel density of 600 ppi×600 ppi (pixel per inch). The respective area in the pixel corresponds to a minimum unit by which the recording or non-recording is defined. One area corresponds to 1200 dpi (dot per inch) in the vertical direction and 2400 dpi in the horizontal direction. In the printing apparatus according to this embodiment, one area defined by about 20 μm in the vertical direction and about 10 μm in the horizontal direction is designed to be printed by one ink droplet of 2 pl of the respective color. The vertical direction of the drawing coincides with the arrangement direction of the ejection orifices in the printing head. Both of the arrangement density of the areas and that of the ejection orifices are 1200 dpi and coincide with each other. The horizontal direction of the drawing coincides with the scanning direction of the printing head. According to this embodiment, the printing is carried out at a density of 2400 dpi in the scanning direction. In the dot arrangement patterning processing J0007, the printing or non-printing of the dot is defined in each of the plurality of areas forming one pixel. Thereby, the 1-bit ejection data of 1 or 0 is generated to a printing element corresponding to the respective area or a column.

In FIG. 2, the area checked by a circle shows one in which the dot of the respective color is to be printed. As the number of levels increases, the number of dots also increases one by one.

According to this embodiment, the dot arrangement patterns for the respective levels are different in ink colors from each other. That is, a plurality of patterns are prepared so that the different arrangements are obtained in correspondence to the ink colors even if the same level is input. Particularly, regarding the red ink (R) which is one of the particular color used for enlarging the gamut, it is designed not to overlap with other color at the level 4 or lower. Conversely, a pair of magenta (M) and light magenta (LM), and a pair of cyan (C) and light cyan (LC) forming substantially the same hue angle, and a pair of yellow (Y) and black (B) hardly overlapping with each other use the same dot arrangement pattern.

According to this embodiment, the stress is laid on the color development of red ink applied for the purpose of enlarging the gamut. Particularly, care is taken that the red ink dot is not overlapped with other ink dot as much as possible on a low level side having a high lightness. Regarding the other inks, care is taken as much as possible not to overlap with the other color ink, while maintaining the exclusive relationship relative to the red ink at the level 4 or lower. By the dot arrangement patterning processing J0007 described above, it is determined whether or not the respective color dot is printed in the area on the printing medium.

Next, in the mask data conversion processing J0008, a dot arrangement of the respective color determined by the dot arrangement patterning processing J0007 is masked by using a plurality of mask patterns in the complementary relationship with each other. The printing data obtained by the respective mask pattern are printed on the printing medium by a plurality of sequential printing scans. Between the adjacent printing scans, a subsidiary scan having an amount smaller than a printing width of the printing head is carried out. Thereby, in the same area of the printing medium, an image is sequentially formed by a plurality of printing scans of different printing elements. The printing carried out by a process described above is referred to as a multi-passage printing. When the multi-passage printing is carried out, drawbacks such as fine streaks due to the variation peculiar to the printing elements or joint lines appearing at a pitch of the subsidiary scan are dispersed all over the image and become inconspicuous. Accordingly, it is possible to obtain a smooth and uniform image.

In this embodiment, a plurality of mask data used in a plurality of printing modes is stored in a memory within a main body of the printing apparatus. In the mask data conversion processing J0008, the AND processing is carried out between the mask data and an output signal from the dot arrangement patterning processing J0007. Thereby, the printing dot actually ejected in the respective printing scan is determined and input as an output signal to a drive circuit J0009 of the printing head H1001.

In this regard, the above explanation has been made while applying the multi-passage printing for the purpose of laying a stress on the image quality. However, the present invention and this embodiment should not be limited thereto. If the multi-passage printing is not applied, the mask data conversion processing J0008 is skipped, and the output signal from the dot arrangement patterning processing J0007 is directly input to the drive circuit J0009.

1-bit data of the respective color input to the drive circuit J0009 is converted to a drive pulse for the printing head J0010, and the ink is ejected from the printing head J0010 for the respective color at a predetermined timing.

In this regard, the above-mentioned dot arrangement patterning processing or mask data conversion processing is executed by using an exclusive hardware thereof under the control of CPU constituting a controller of the printing apparatus.

This embodiment is characterized in that the dot arrangement pattern is selected so that the red ink which is a particular color used for enlarging the gamut is not overlapped with any other ink color on the lower level side. Particularly, the dot arrangements of magenta ink, light magenta ink and yellow ink having a hue similar to the red ink and often used at the same time are completely exclusive of the red ink. Thereby, it is possible to effectively exhibit the color development of the red ink on condition that the lightness and the chroma are at high level. In such a manner, the ink dot arrangement patterns of magenta and yellow inks which can represent the color regeneration area including the hue angle of the red ink are preferably different from the dot arrangement pattern of the red ink. This may not be limited to the red ink but widely applied to all the particular color inks. That is, regarding two of the three basic colors, magenta, yellow and cyan, which can represent the color regeneration area including the hue angle of the particular color ink, the dot arrangement pattern thereof is preferably differentiated from that of the particular color ink.

In the above description, the dot arrangement pattern is adopted, in which the dots of the particular color ink (in this case, the red ink) are completely exclusive of the dots of any other color ink than the particular color. However, this embodiment is not limited to such a completely exclusive pattern. According to this embodiment, it is solely required that the dot arrangement pattern of the particular color ink (red ink) is different from the dot arrangement pattern at level 1 of at least one of color inks other than the particular color ink. For example, the dot arrangement pattern of the is particular color ink (red ink) may be the same as the dot arrangement pattern of light magenta (LM), cyan (C), light cyan (LC), yellow (Y) and black (K), but solely different from the dot arrangement pattern of magenta (M). In this case, the color development of the particular color ink becomes lower than in a case wherein the completely exclusive dot arrangement pattern described with reference to FIG. 2 is adopted. However, it is possible to facilitate the color development of the particular color ink in comparison with a case wherein the same dot arrangement pattern is used for all color inks including the particular color.

In the above description, while the red ink is used as a particular color ink for enlarging the gamut, the present invention should not limited thereto. Particular color inks other than red ink, for example, blue ink or green ink, may be adopted, or may be combined with each other. Also, inks other than the particular color inks (red ink, blue ink and green ink) may not be limited to the above-mentioned examples. For example, light cyan or light magenta may not be used.

Figure 3:
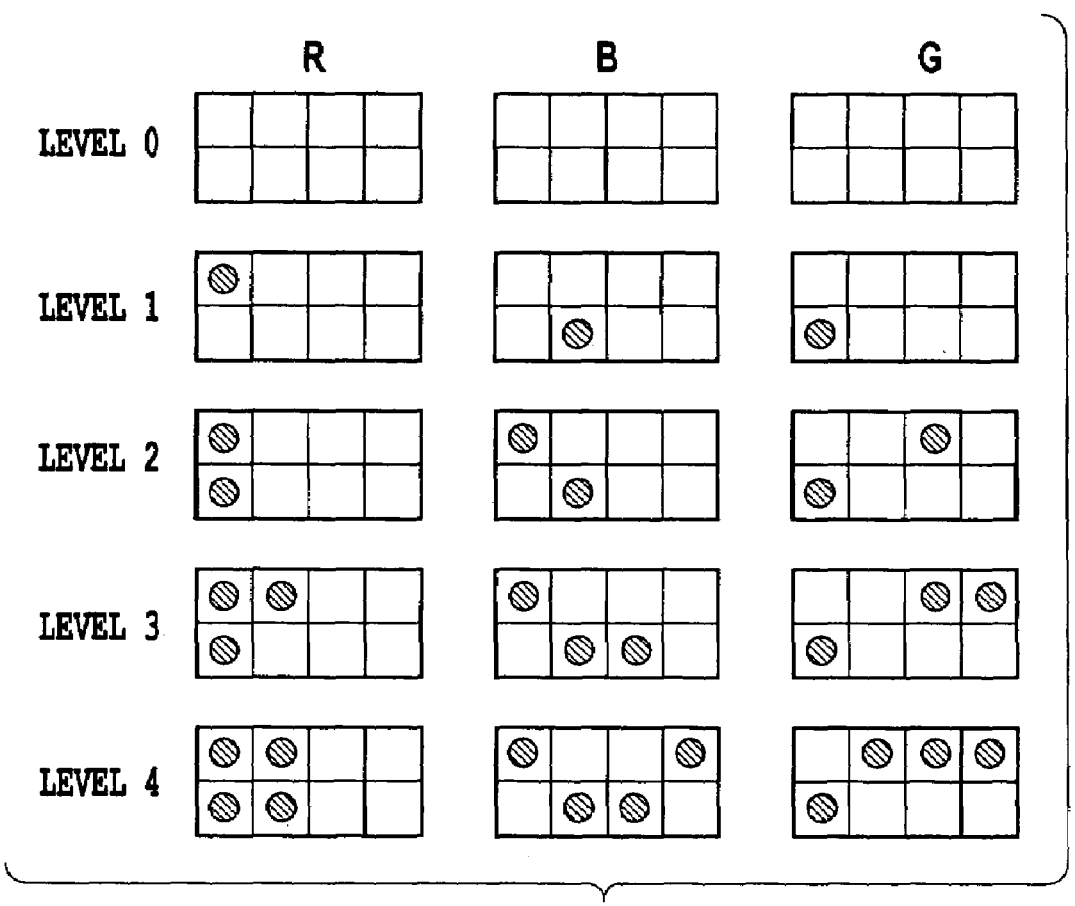
FIG. 3 illustrates dot arrangement patterns of blue and green inks until level 4 in the first embodiment of the present invention.

FIG. 3 illustrates another example of the dot arrangement patterns at levels lower than level 4 when blue and green ink are used as particular color inks in addition to the red ink described above. When many kinds of ink are used in such a manner, it is difficult to form the completely exclusive relationship between all the particular color inks even at lower levels. In FIG. 3, red, blue and green inks have the dot arrangement patterns different from each other although not completely exclusive.

Effects of this embodiment may be obtainable even if all the colors do not have the dot arrangement patterns completely exclusive of each other as described above. In the dot arrangement patterns, the respective colors may have a suitable relationship in accordance with kinds and characteristics of the color development of ink color used therein the stress is laid on the color development of the ink prepared for enlarging the gamut, the effect of the present invention will be completely achievable solely by using the above-mentioned constitution.

Regarding the particular color ink, it is possible to effectively exhibit the color development of the particular color ink by using the dot arrangement pattern different from those of other color inks if possible.

In the above description, the dot arrangement patterning processing has been explained wherein input density data having 9 gradation levels per one pixel are arranged in a region of 2 areas in the vertical direction ×4 areas in the horizontal direction. However, the present invention should not be limited to such gradations and areas.

Second Embodiment

Figure 4:
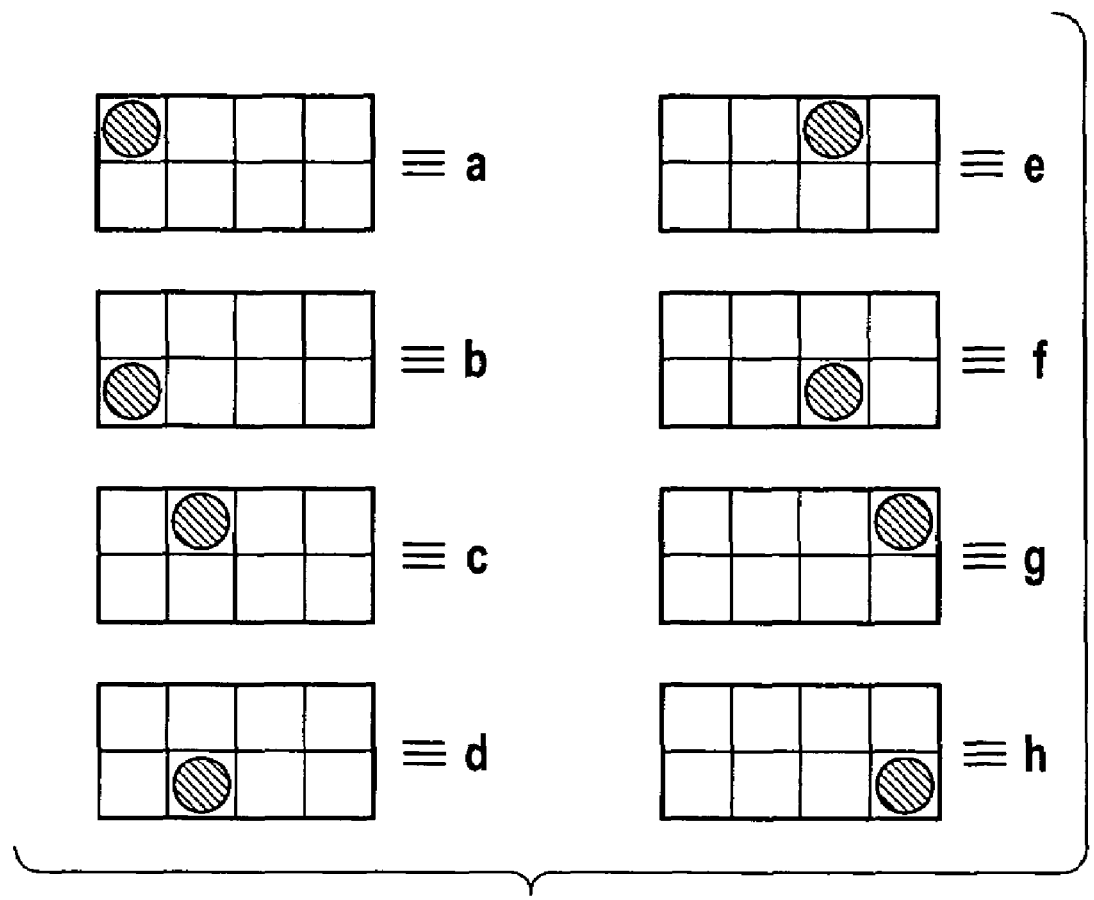
FIG. 4 illustrates dot arrangement patterns applied to a second embodiment of this invention.

A second embodiment of the present invention will be described below. Also in this embodiment, the flow of the image data conversion processing is the same as shown in FIG. 1 for the first embodiment FIG. 4 illustrates examples of the dot arrangement pattern applied to this embodiment. In FIG. 4, patterns a to h show eight kinds of dot arrangement patterns corresponding to the level 1. While the description is made solely on the level 1 for the simplicity, the dot arrangement patterns different from each other are actually prepared for the levels higher than 2 in the same manner as the level 1. In this embodiment, the plurality of dot arrangement patterns different from each other in the same level is prepared for the same ink color. These patterns are corresponded in a predetermined order or a random order as shown in FIGS. 5A to 8. That is, when the same level is uniformly input, eight kinds of dot arrangement patterns shown by a to h are printed on the recording medium while arranged in the predetermined order or the random order. By forming such a constitution, effects are obtainable as described in the above-mentioned patent documents, for equalizing the ejection number between the printing element located at an upper position in the dot arrangement pattern and that located at a lower position thereof or for dispersing various noises peculiar to the printing apparatus.

In this embodiment, a matrix is constituted by arranging the dot arrangement patterns different from each other shown in FIG. 4 to form a matrix of m in the main scanning direction and ×n in the subsidiary scanning direction, respectively, as a minimum unit which is repeated in the main scanning direction and in the subsidiary scanning direction to carry out the printing. In this regard, m and n are integers, respectively, and at least one of m and n is 2 or more.

Figure 15:
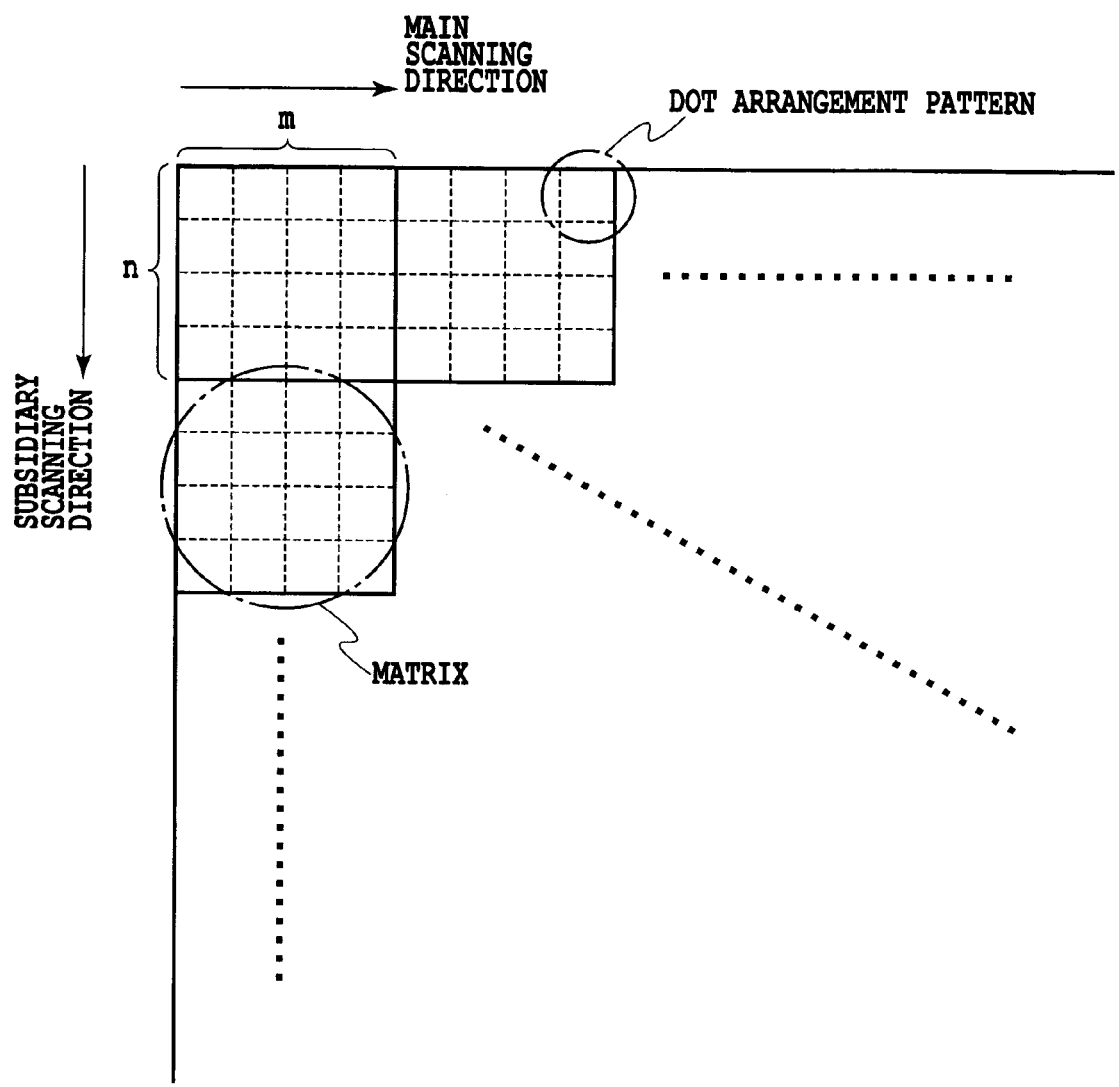
FIG. 15 is a schematic view for illustrating a cyclic arrangement of m×n matrix.

FIG. 15 illustrates the repetition of the matrix of m×n. An example of the matrix of m×n is a matrix of 4×4 shown in FIGS. 5A to 8.

Figure 16:
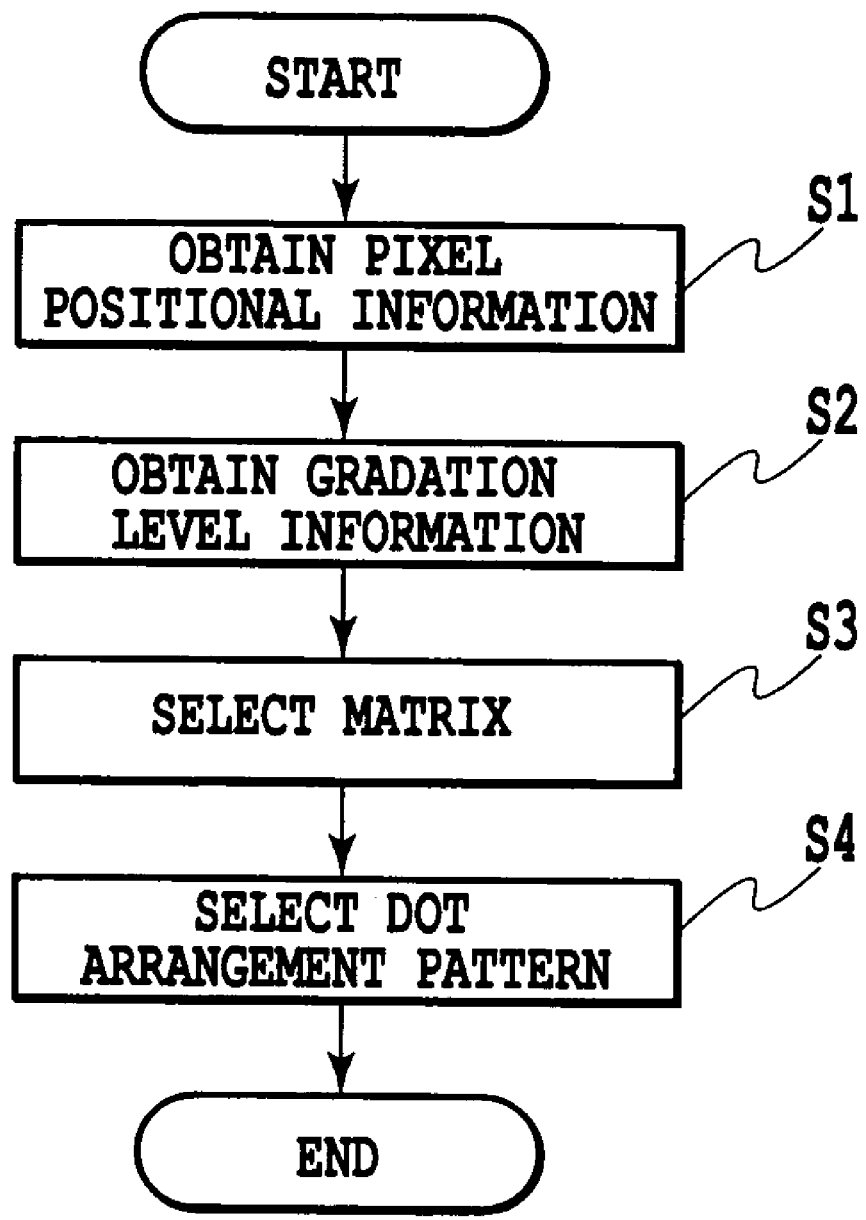
FIG. 16 is a flow chart for illustrating the steps for selecting the dot arrangement pattern corresponding to a position of the pixel from the matrix of m×n.

A method for allocating the dot arrangement patterns in the matrix of m×n to the respective pixels will be described. FIG. 16 is a flow chart for illustrating the steps for selecting the dot arrangement pattern corresponding to a position of the pixel from the matrix of m×n. The steps shown in FIG. 16 are carried out for every ink colors.

First, at step S1, the positional information (x, y) of a marked pixel is obtained, wherein x is a position on a pixel line (luster) extending in the main scanning direction and y is a position on a pixel line (column) extending in the subsidiary scanning line. Then, at step S2, a gradation value (levels 0 to 8) of the marked pixel is obtained. At step S3, a matrix corresponding to the gradation value obtained at step 2 is selected. At step S4, a dot arrangement pattern corresponding to the positional information (x, y) of the marked pixel is selected from the matrices selected at step S3 with reference to the pixel positional information (x, y) obtained at step 1. By carrying out such processings on the respective pixels, it is possible to allocate the dot arrangement pattern to the respective pixel.

The above-mentioned processings will be described in relation to the matrix in FIG. 5A. If the pixel positional information (x, y) obtained at step S1 is (1, 1), and the gradation value obtained at step S2 is a level 1, at step S3, the matrix of 4×4 shown in FIG. 5A is selected. At step S4, the dot arrangement pattern a corresponding to the pixel positional information (1, 1) is selected from the matrices of 4×4 shown in FIG. 5A. In this regard, if the pixel positional information (x, y) obtained at step S1 is (2, 1), (3, 1) and (4, 1), the dot arrangement patterns b, c and d are selected, respectively, at step S4. Alternatively, if the pixel positional information (x, y) obtained at step S1 is (1, 2), (1, 3) and (1, 4), the dot arrangement patterns a, c and h are selected, respectively, at step S4. In addition, it will be readily realized, by taking the repeated use of the matrix of 4×4 into account, that the dot arrangement patterns a, b, c and are selected, respectively, at step S4 if the pixel positional information (x, y) obtained at step S1 is (5, 1), (6, 1), (7, 1) and (8, 1).

Matrices shown in FIGS. 5A to 5C will be described as examples of a matrix of m×n applicable to this embodiment. FIGS. 5A to 5C illustrate matrices of 4×4, respectively, in which the dot arrangement patterns a to h shown in FIG. 4 are arranged. FIGS. 5A to 5C illustrate examples of dot arrangement patterns a to h of red ink (R), and magenta ink (M), light magenta ink (LM), yellow ink (Y) and black ink (K) determined to be exclusive as much as possible of the red ink on the printing medium. The vertical direction of the drawing coincides with the vertical direction of the respective dot arrangement patterns a to h, i.e., the arrangement direction of the printing elements in the printing head. Also, the horizontal direction coincides with the scanning direction of the printing head. As apparent from the drawing, this embodiment is characterized in that while the dot arrangement patterns a to h are used for all the ink colors, the order of the arrangement of the dot arrangement patterns are different from each other between the, respective colors. By adopting such a constitution, even if dots of different colors are overlapped with each other in some of 2×4 areas (areas, each corresponding to one pixel encircled by a circle in FIG. 5A), the overlap of dots is avoidable in many other areas. Accordingly, if a region has a certain size, it is possible to effectively maintain the color development of the particular color ink. In this regard, in FIGS. 5A to 5C, a plurality of dot arrangement patterns a to h are arranged randomly so that the respective colors are differentiated.

In FIGS. 5A to 5C, the arrangement order of the dot arrangement pattern of cyan (C) and light cyan (LC) is not shown. The arrangement order of cyan (C) and light cyan (LC) may be the same as either one of FIGS. 5A to 5C, or may be different at all therefrom. To most facilitate the color development of red ink (R), it is optimum to adopt the arrangement order other than that shown in FIG. 5A. However, the arrangement order of FIG. 5A may be adopted. This is because there is less chance wherein red ink (R) is imparted to the same pixel together with cyan ink (C) or light cyan ink (LC), and thereby the color development of the red ink is hardly deteriorated.

In this embodiment, it is solely required that the arrangement order of the dot arrangement pattern of the particular color ink (red ink) is different from the arrangement order of the dot arrangement pattern of at least one ink other than the special ink. For example, FIG. 5A may be adopted as the arrangement order of the dot arrangement patterns of the special ink (red ink), light magenta (LM), cyan (C), light cyan (LC), yellow (Y) and black (K), and FIG. 5B may be adopted as the arrangement order of the dot arrangement pattern of magenta (M). In this case, however, in comparison with the aspect described with reference to FIGS. 5A to 5C, the color development is inferior. But, in comparison with the aspect wherein the same order is adopted for all color inks including the particular color ink, the color development is superior.

FIGS. 6A to 6C illustrate other examples of the arrangement order (matrix) of the dot arrangement patterns applied to this embodiment. FIGS. 6A to 6C illustrate 4×4 matrices arranging the four dot arrangement patterns a to d shown in FIG. 4. For example, FIG. 6A illustrates the dot arrangement order of the dot arrangement pattern of the red ink. In this drawing, four dot arrangement patterns are circulated in the order of a→b→c→d in the uppermost row of pixels. In the second row of the pixels, the dot arrangement patterns are arranged while shifting the row of the pixels in the uppermost row by one pixel rightward. In the third row or that succeeding thereto, the dot arrangement patterns are arranged while shifting the row of the pixels in the preceding row by one pixel rightward.

FIGS. 6A and 6C illustrate examples of the arrangement of the ink color (for example, magenta, light magenta and yellow) which dot arrangement is exclusive as much as possible of that of the red ink shown in FIG. 6A. In the drawings, the uppermost rows of pixels in FIGS. 6B and 6C have the same arrangement as in FIG. 6A. However, in the second to fourth rows, a shift amount from the upper row is different relative to FIG. 6A. In FIG. 6B, the dot arrangement pattern is shifted rightward by two pixels, while in FIG. 6C, the dot arrangement pattern is shifted rightward by minus one pixel (leftward by one pixel). If the shift amount is made to differentiate between the respective colors in such a manner, it is possible to realize a circumstance wherein no dots are overlapped with each other almost all portions in the same manner as described with reference to FIGS. 5A to 5C. On the other hand, since it is solely required for shifting a predetermined arrangement by a predetermined amount, a memory necessary for storing the dot arrangement pattern in the printing apparatus can be reduced in comparison with a case shown in FIGS. 5A to 5C.

There are other methods for forming a plurality of dot arrangements different from each other by using the four kinds of dot arrangement pattern a to d as described above. Examples thereof will be briefly described below.

Figure 7:
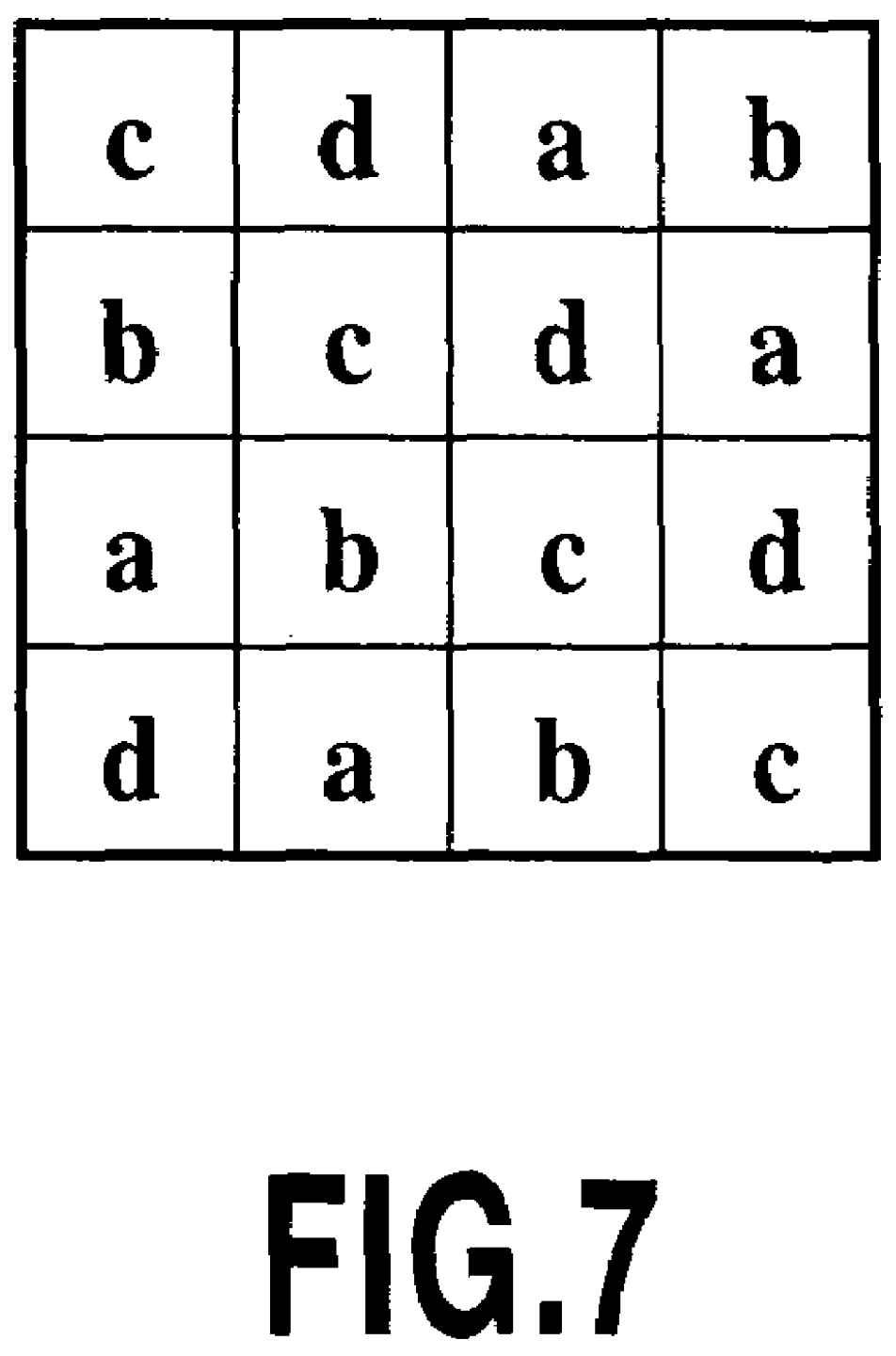

FIG. 7 shows one example of the m×n matrix. FIG. 7 shows one example of an arrangement order formed by a method different from the method described with reference to FIGS. 6A to 6C, so that the red ink in FIG. 6A is exclusive as much as possible. This method is characterized in that, while the order of the arrangement in the horizontal direction is the same as in FIG. 6A, the dot arrangement pattern used in a pixel at a starting point (the left end of the uppermost row) is different from that in FIG. 6A. For example, in FIG. 6A, the pixel at the starting point is the dot arrangement pattern a and the respective patterns are arranged in the order of a→b→c→d→a→b→c→d in the horizontal direction. Contrarily, in FIG. 7, the pixel at the starting point is the dot arrangement pattern c and the respective patterns are arranged in the order of c→d→a→b→c→d→a→b. In the subsequent lower rows, in the same manner as in FIG. 6A, the dot arrangement pattern in the adjacent lower row is arranged by shifting one pixel in the right direction relative to the upper row.

The same effect is achievable by the above-mentioned method wherein the same arrangement patterns are used but the starting points are different from each other as that of the method described with reference to FIGS. 6A to 6C. That is, it is possible to form the exclusive arrangements at level 1 in all areas while minimizing a capacity of a memory necessary for storing the dot arrangement patterns in the printing apparatus.

Figure 8:
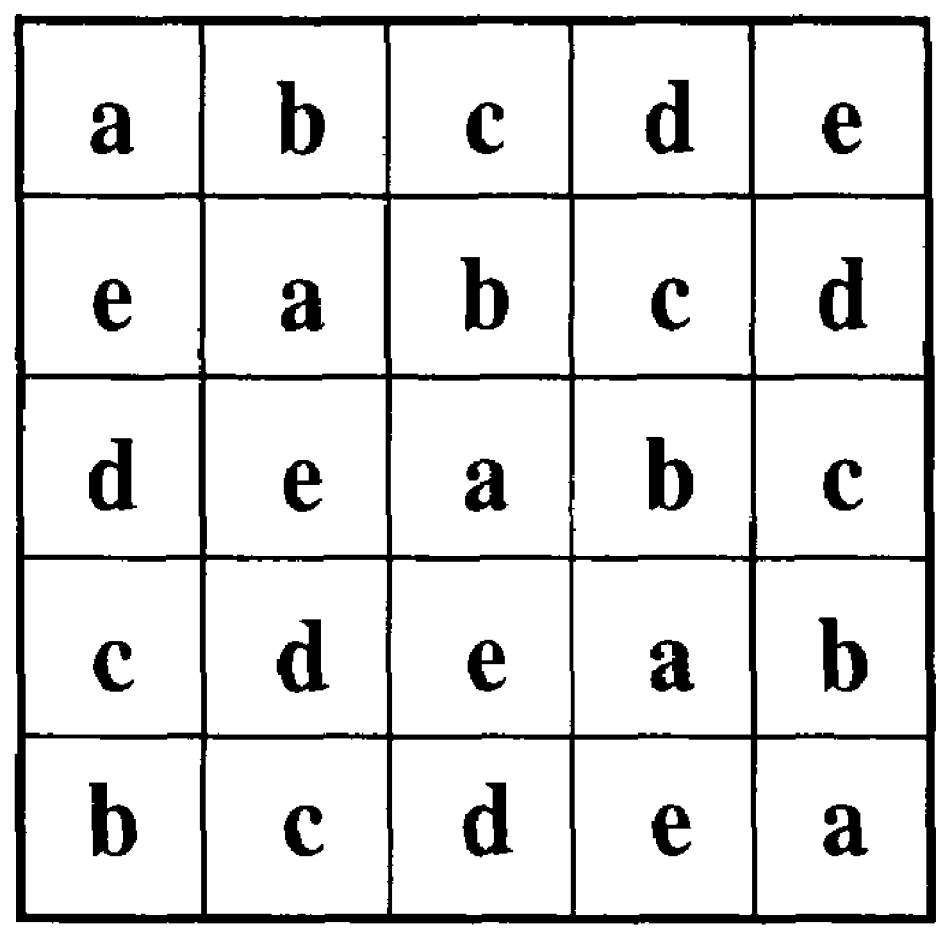

Lastly, FIG. 8 illustrates another example of the m×n matrix. FIG. 8 illustrates a case wherein the horizontal arrangement period is different from the example shown in FIG. 6A while the starting points are coincided with each other. In FIG. 6A, four kinds of dot arrangement patterns a to d are regularly shifted. In FIG. 8, five kinds of dot arrangement patterns a to e are regularly shifted.

As described above, there are various methods for forming the dot arrangement patterns different from each other, and any of them is effective for this embodiment. For example, as described with reference to FIGS. 6A to 6C, the arrangement of the dot arrangement patterns in the respective rows may be randomly shifted.

This embodiment is characterized in that the order of the dot arrangement pattern of the particular color ink and that at least one of inks other than the particular color ink are different from each other, while a plurality of dot arrangement patterns (for example, a to h) are used. This constitution is effective for minimizing the probability of the overlap of the different color dots as much as possible on the low level side and facilitating the color development of many ink colors in a wider area in comparison with the first embodiment.

In this regard, also in this embodiment, the particular color other ink than red ink, for example, blue ink or green ink, may be used in the same manner as in the first embodiment, or all of them may be used together. Inks other than the special inks (red ink, blue ink or green ink) should not be limited to the above-mentioned examples. For example, light cyan and light magenta may not be used. In the same manner as in the first embodiment, examples should not be limited to those in which input density data having nine gradations per one pixel are processed in a region of 2 areas in the vertical direction ×4 areas in the horizontal direction. Further, in this embodiment, the arrangement period of the respective dot arrangement patterns should not be limited to the above-mentioned constitution A longer or shorter period may be used in the vertical and horizontal directions, or the arrangement may have no periodicity at all in the printing area.

As described above, according to this embodiment, by differentiating the allocation order of a plurality of different dot arrangement patterns corresponding to the same level between the particular color inks and the other color inks, it is possible to effectively facilitate the color development of the special inks.

Third Embodiment

While a plurality of different dot arrangement patterns are used at the same gradation level in the above-mentioned second embodiment as shown in FIG. 4, kinds thereof used for the particular color ink and the other color ink are the same with each other. The third embodiment is characterized in that the dot arrangement patterns are different between the particular color ink and the other color ink although a plurality of different dot patterns are used in the same manner as in the second embodiment.

EXAMPLE 1

One example of this embodiment will be described below. In this example, the dot arrangement patterns a, b, c and d shown in FIG. 4 are used for the particular color ink, and the dot arrangement patterns e, f, g and h shown in FIG. 4 are used for the other color ink. The dot arrangement pattern is allocated to the respective pixel in accordance with either one of the following three methods.

(Method 1)

A plurality of dot arrangement patterns used for the particular color ink or the other color ink are selected in a predetermined order, and the selected dot arrangement patterns are sequentially allocated to the respective pixels. That is, regarding the particular color ink, the dot arrangement patterns a, b, c, d are periodically selected in the order of a→b→c→d→ every time when the output from the half toning J0005 shows the gradation level 1, and the selected dot arrangement pattern is allocated to the pixel of the gradation level 1. On the other hand, regarding the other color ink, the dot arrangement patterns e, f, g, h are periodically selected in the order of e→f→g→h→ every time when the output from the half toning J0005 shows the gradation level 1, and the selected dot arrangement pattern is allocated to the pixel of the gradation level 1.

(Method 2)

A plurality of dot arrangement patterns used for the particular color and the other color ink are randomly selected, and the selected dot arrangement patterns are allocated to the respective pixels. That is, regarding the particular color ink, one dot arrangement pattern is randomly selected from a group of a, b, c and d every time when the output from the half toning J0005 shows the gradation level 1, and the selected dot arrangement pattern is allocated to the pixel of the gradation level 1. Regarding the other color ink, one dot arrangement pattern is randomly selected from a group of e, f, g and h every time when the output from the half toning J0005 shows the gradation level 1, and the selected dot arrangement pattern is allocated to the pixel of the gradation level 1.

(Method 3)

A plurality of dot arrangement patterns used for the particular color ink and the other color ink are selected in accordance with the pixel positions, and the selected dot arrangement patterns are allocated to the respective pixels. That is, regarding either the particular color ink or the other color ink, the dot arrangement patterns are arranged in accordance with a rule described in the second embodiment with reference to FIGS. 5 to 8 to form the matrix of m×n. Concretely, regarding the particular color ink, a matrix of m×n in which the dot arrangement patterns a, b, c and d are arranged is formed. On the other hand, regarding the other color ink, a matrix of m×n in which the dot arrangement patterns e, f, g and h are arranged is formed. As described in the second embodiment, the dot arrangement pattern corresponding to the pixel positional information is selected from the matrix, and the selected dot arrangement pattern is allocated to the pixel.

EXAMPLE 2

Next, another example of this embodiment will be described below. While the completely different dot arrangement patterns are applied to the particular color ink and the other color ink in Example 1, the same dot arrangement pattern is partially used for the particular color ink and the other color ink in Example 2. For example, the dot arrangement pattern a, b, c, d, e and f in FIG. 4 is used for the particular color ink, and the dot arrangement pattern e, f, g, h, a and b in FIG. 4 is used for the other color ink. And, the dot arrangement pattern is allocated to the respective pixel in accordance with either one of the above-mentioned three methods.

According to Example 2, since the same dot arrangement pattern is partially used, there may be a case in which the dot arrangement of the particular color ink completely coincides with that of the other color ink in the same pixel. Accordingly, in comparison with the aspect described in Example 1 in which the completely exclusive dot arrangement pattern is used, the color development of the particular color ink deteriorates. However, it is possible to facilitate the particular color ink development in comparison with a case in which the same dot arrangement patterns are used for all the color inks including the particular color-ink.

EXAMPLE 3

Next, a further example of this embodiment will be described below. In Examples 1 and 2, kinds of the dot arrangement patterns are different from each other between the particular color ink and the other color ink. This embodiment should not be limited thereto. For example, kinds of the dot arrangement patterns may be different from each other between the respective ink colors. Also, all the ink colors may be classified into suitable groups (group 1: R/group 2: M, LM/group 3: C, CL/group 4: Y, K), between which kinds of the dot arrangement patterns are differentiated.

According to this embodiment described above, since the used dot arrangement patterns are differentiated between the particular color ink and the other color ink while each color ink using a plurality of dot arrangement patterns different from each other, the color development of the particular color is effectively exhibited while the number of operating of the respective nozzle is equalized.

(Other Constitutions)

A constitution for realizing the above-mentioned first, second and third embodiments will be described below. In the following description, inks of seven colors, cyan, light cyan, magenta, light magenta, yellow, black and red, are used. In this regard, as described in the above embodiments, used inks are not limited to this combination.

(Schematic Structure of Mechanism of Ink-Jet Apparatus)

First the schematic structure of a mechanism of the ink-jet printing apparatus will be described. A main body of the printing apparatus is constituted by a paper feeding section, a paper conveying section, a carriage section, a paper discharge section, a cleaning section and a designed outer casing section for protecting these sections. These shall be schematically explained below.

Figure 9:
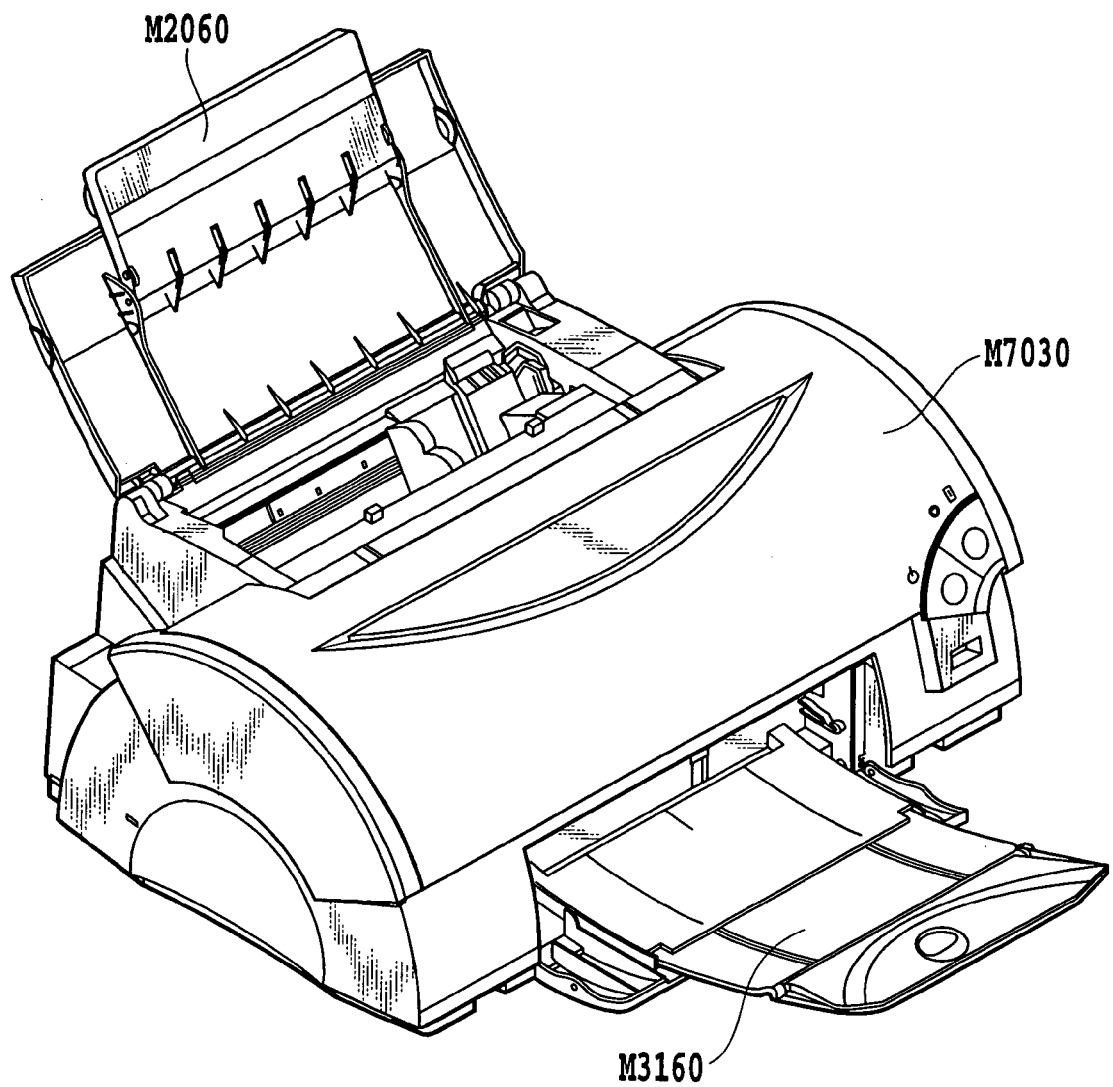
FIG. 9 is a perspective view of a printing apparatus capable of realizing the first and second embodiments of the present invention.
Figure 10:
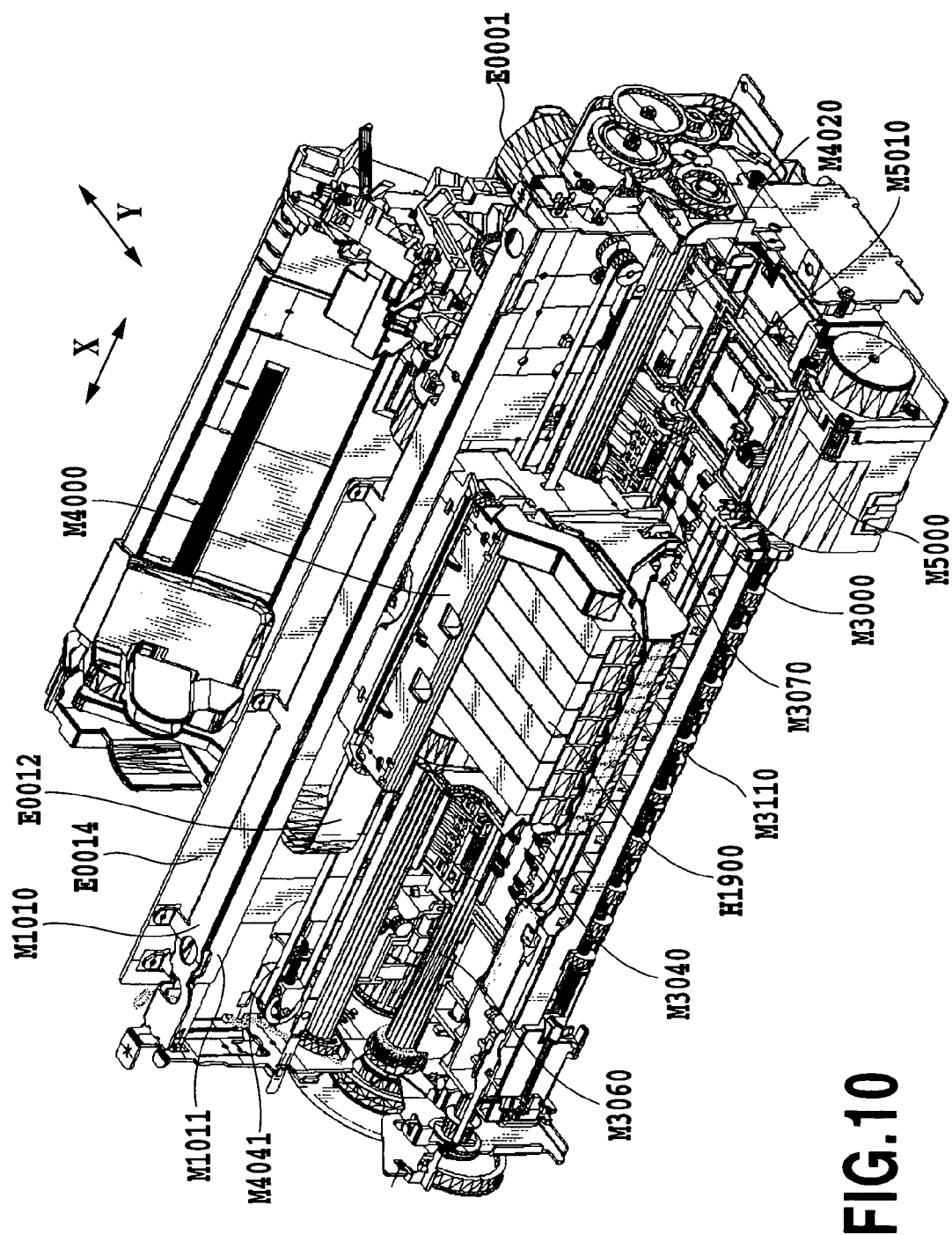
FIG. 10 is a perspective view of a mechanism of the printing apparatus capable of realizing the first and second embodiments of the present invention.
Figure 11:
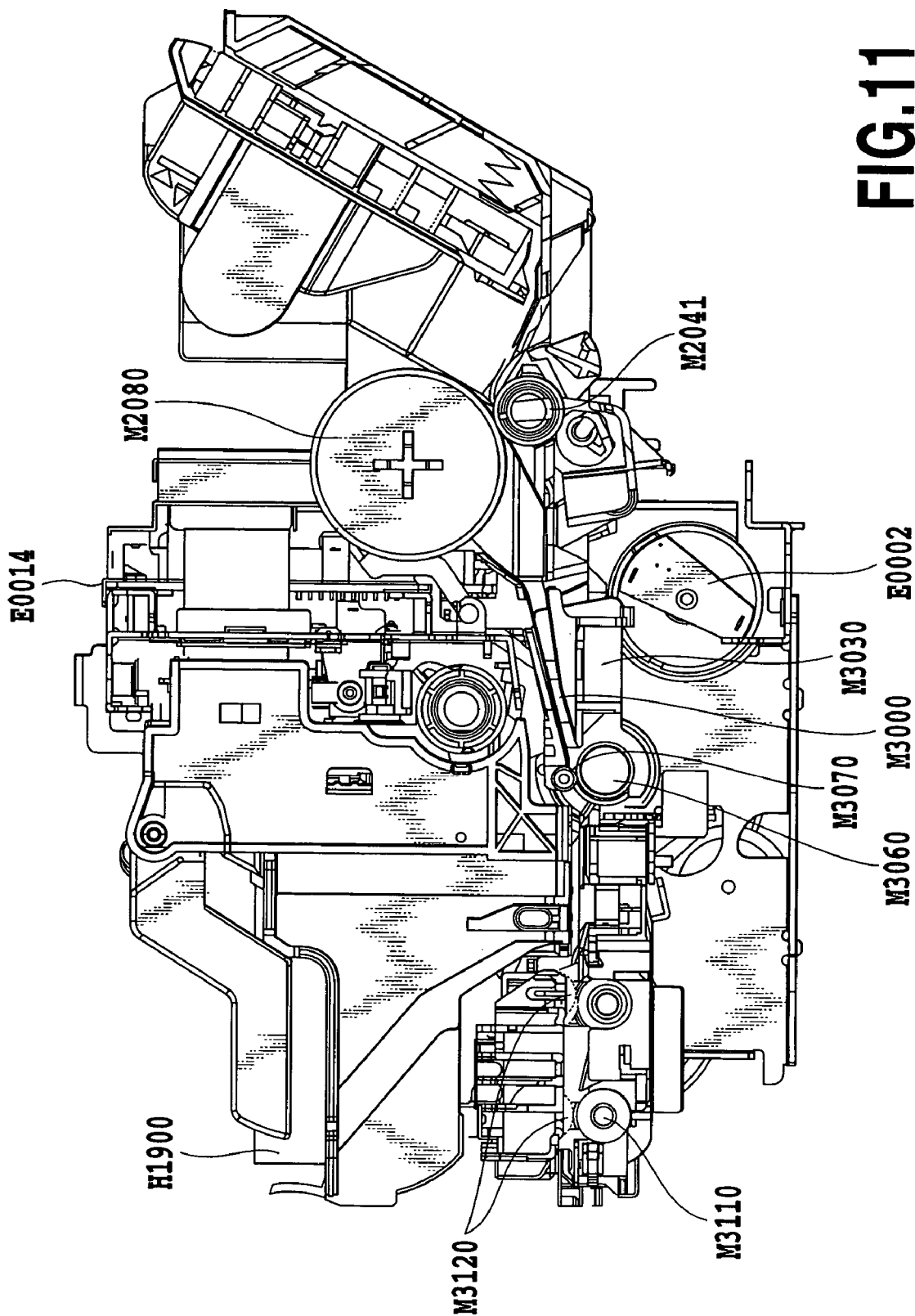
FIG. 11 is a sectional view of the printing apparatus capable of realizing the first and second embodiments of the present invention.

FIG. 9 is a perspective view of the printing apparatus FIGS. 10 and 11 are drawings for explaining an interior mechanism of the main body of the printing apparatus, wherein FIG. 10 is a perspective view as seen from the upper right position and FIG. 11 is a side sectional view of the main body of the printing apparatus, respectively.

During the paper feeding, a predetermined number of printing media are delivered to a nip section formed of a paper-feed roller M2080 and a separating roller M2041. The printing media thus delivered are separated in the nip section so that the uppermost printing medium is solely conveyed to the paper conveying section. The printing medium fed to the paper conveying section is guided to a pinch roller holder M3000 and a paper guide flapper M3030, and delivered to a pair of a conveyor roller M3060 and a pinch roller M3070. The roller pair formed of the conveyor roller M3060 and the pinch roller M3070 is rotated by an LF motor E0002, whereby the printing medium is conveyed on a platen M3040.

The carriage section has a carriage M4000 for attaching a printing head H1001. The carriage M4000 is supported by a guide shaft M4020 and a guide rail M1011. The guide shaft M4020 is mounted to a chassis M1010 so that the carriage M4000 reciprocates to scan the printing medium in the vertical direction relative to the conveying direction of the printing medium. The carriage M4000 is driven by a carriage motor E0001 attached to the chassis M0101 via a timing belt M4041. Further, a flexible cable (not shown) is connected to the carriage M4000, for transmitting a drive signal 5 from an electric board E0014 to the printing head H1001. When an image is formed on the printing medium in such a structure, the pair of conveyor roller M3060 and the pinch roller M3070 conveys the printing medium and positions the same in the conveying direction (a column direction). In the scanning direction (a luster direction), the carriage M4000 is shifted vertically in the conveying direction by the carriage motor E0001 to dispose the printing head H1001 (FIG. 2) at the aimed image-forming position.

The printing head H1001 thus located ejects ink to the printing medium in accordance with signals from the electric board E0014. In the printing apparatus of this embodiment, the image is formed on the printing medium by repeating a main printing scan of the carriage M4000 in which the printing is carried out by the printing head H1001 alternately with a subsidiary scan in which the printing medium is conveyed by the conveyor roller M3060. A detailed structure of the printing head H1001 will be described later.

Finally, the printing medium on which the image has been formed is conveyed while being nipped between a first paper discharge roller M3100 and a spur M3120 in the paper discharge section and discharged into a paper discharge tray M3160.

In this regard, in the cleaning section, when a pump M5000 is operated while bringing a cap M5010 into tight contact with ink ejection orifices of the printing head H1001, unnecessary ink or other material is sucked from the printing head H1001. Thereby, it is possible to clean the printing head H1001 before and after the image printing. Also, it is possible to suck ink left in the cap M5010 in an opening state of the cap M5010. Accordingly, it is possible to avoid the fixing of the residual ink and troubles caused thereby.

(Constitution of Printing Head)

The structure of a head cartridge H1000 used for the above embodiment will be described below. The head cartridge H1000 has the printing head H1001, means for mounting the printing head H1001 and some ink tanks H1900, and means for supplying ink from the ink tank H1900 to the printing head, and is detachably mounted to the carriage M4000.

Figure 12:
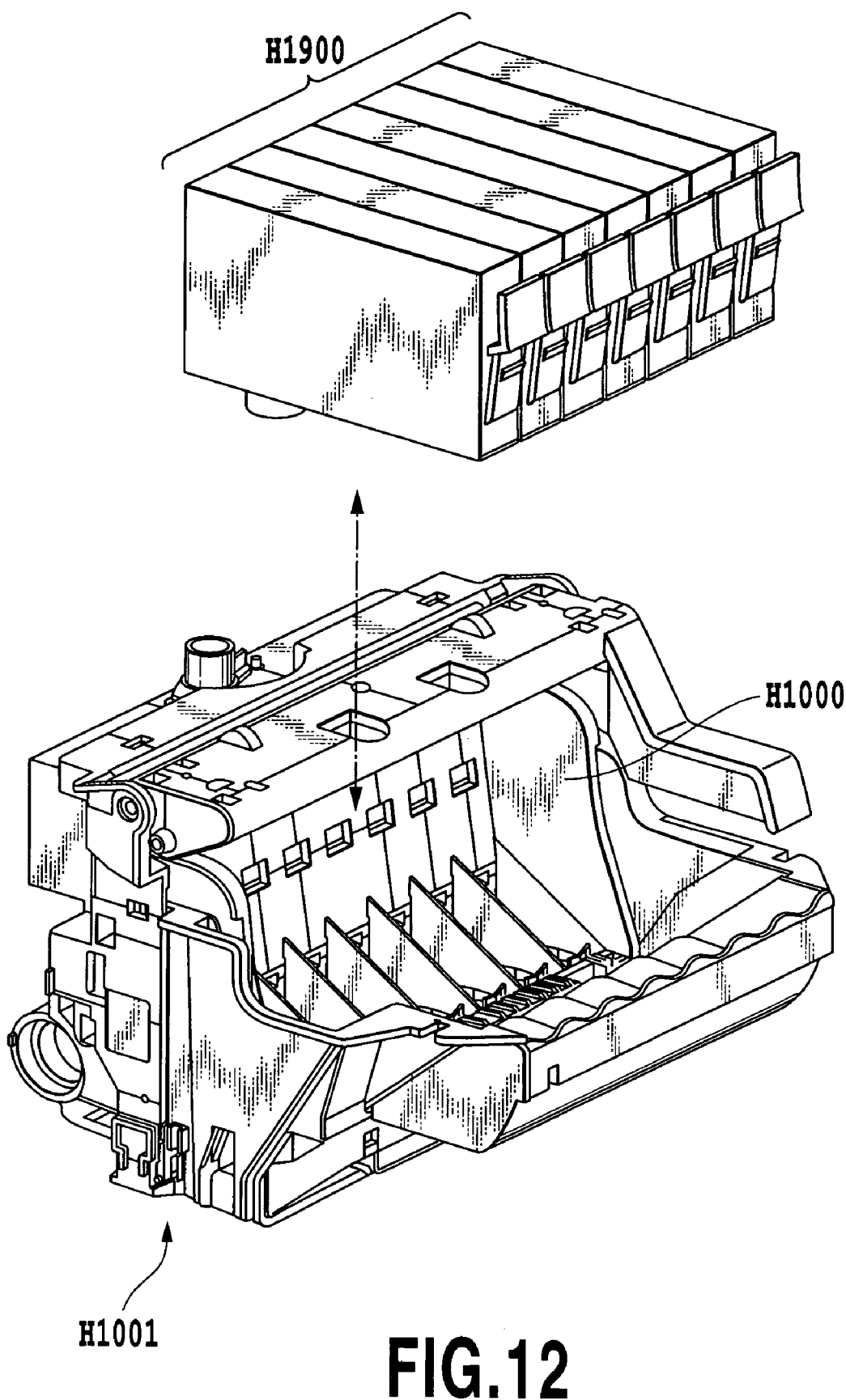
FIG. 12 is a perspective view of a head cartridge applicable to the present invention, to which some ink tanks are being mounted.

FIG. 12 shows that the ink tank H1900 is mounted to the head cartridge H1000 applicable to this embodiment. Since the printing apparatus forms the image with inks of seven colors, cyan, light cyan magenta, light magenta, yellow, black and red, the ink tank H1900 has independent blocks for the seven color inks, respectively. The attachment/detachment of the ink tank H1900 can be carried out while mounting the head cartridge H1000 on the carriage M4000.

Figure 13:
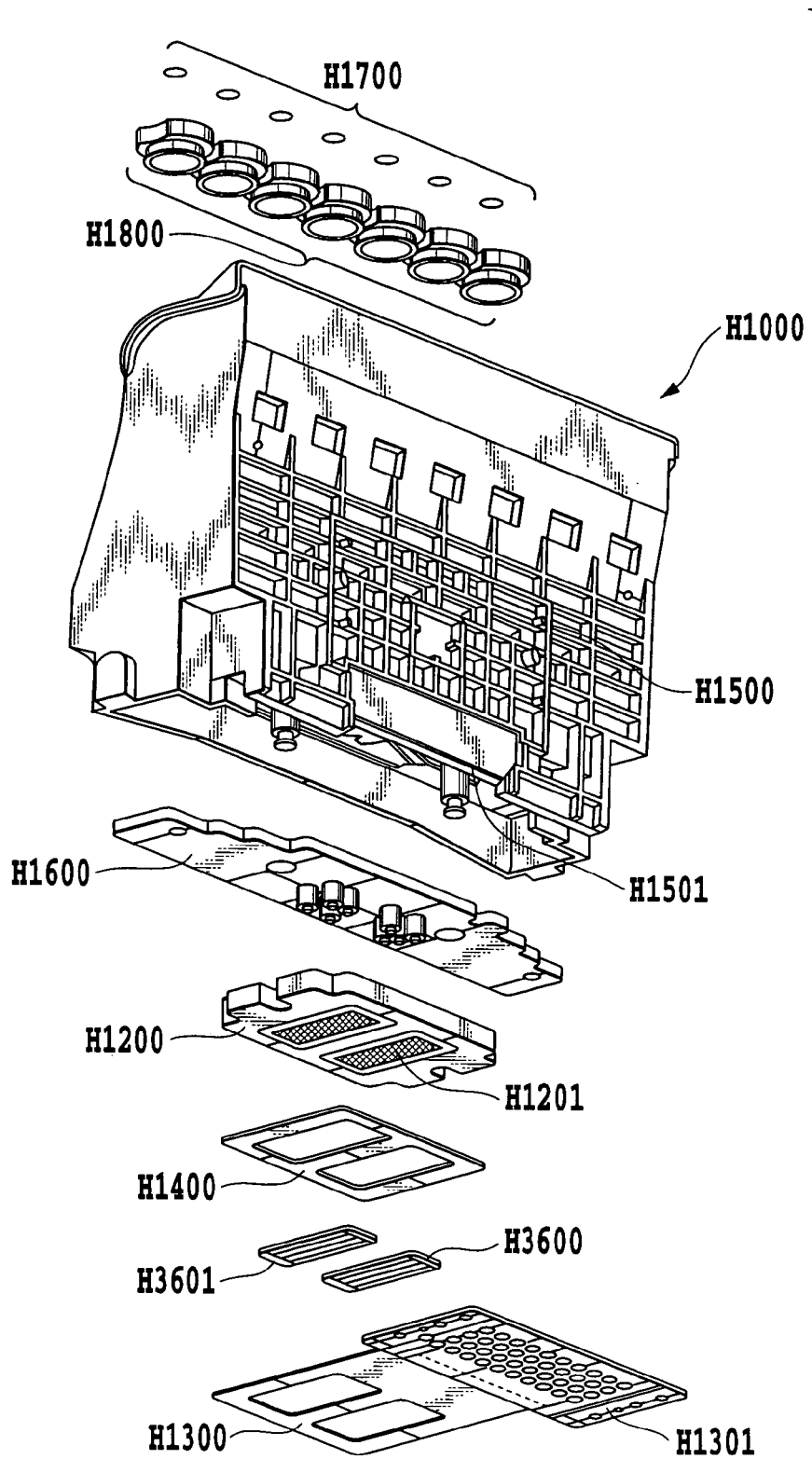
FIG. 13 is an exploded perspective view of the head cartridge applicable to the present invention.

FIG. 13 is an exploded perspective view of the head cartridge H1000. In this drawing, the head cartridge H1000 is formed of a first printing element board H3600, a second printing element board M3601, a first plate H1200, a second plate H1400, an electric wiring board H1300, a tank holder H1500, a flow path forming member H1600, a filter H1700, a seal rubber H1800 or others.

Each of the first printing element board H3600 and the second printing element board H3601 is an Si substrate, on one surface of which are formed by a photo-lithographic technique plurality of printing elements (nozzles) for ejecting ink. Electric wiring of Al or other material for supplying electric power to the respective printing elements is formed by a film deposition technique. A plurality of ink passages corresponding to the individual printing elements are also formed by a photo-lithographic technique. Further, an ink supplying port for supplying ink to the respective ink passage is formed to open to a rear surface.

Figure 14:
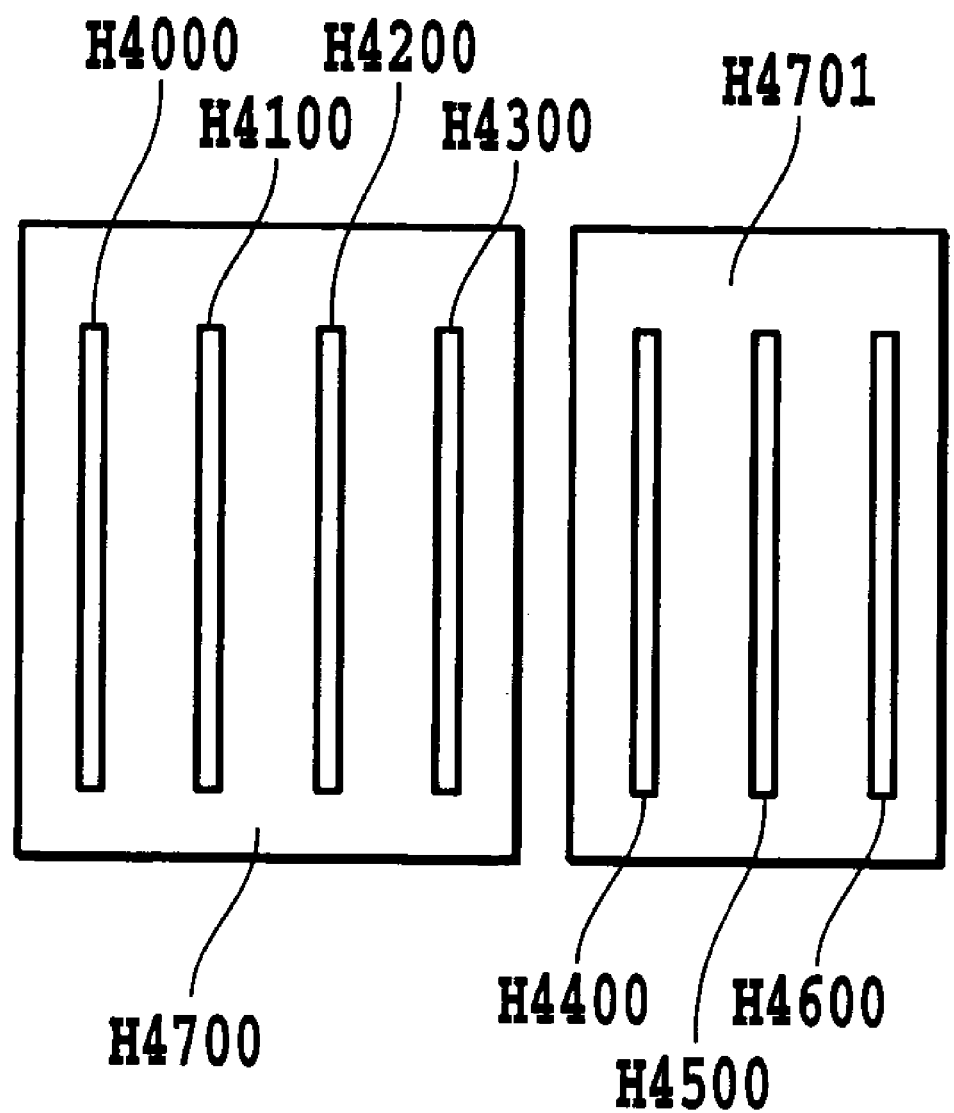
FIG. 14 is a front view of a printing element substrate in the head cartridge applicable to the present invention.

FIG. 14 is an enlarged front view for explaining the constitution of the first printing element board H3600 and the second printing element board H3601. H4000 to H4600 are rows of nozzles corresponding to different ink colors, respectively. In the first printing element board H3600, there are four rows of nozzles: H4000 supplied with light magenta ink, H4100 supplied with red ink, H4200 supplied with black ink and H4300 supplied with light cyan ink. In the second printing element board H3601, there are three rows of nozzles: H4400 supplied with cyan ink, H4500 supplied with magenta ink and H4600 supplied with yellow ink.

The respective row is composed of 768 nozzles arranged at an interval of 1200 dpi (dot per inch) in the conveying direction of the printing medium. Each nozzle ejects an ink droplet of approximately 2 pico-litre. An opening area of the respective nozzle orifice is approximately 100 $\mu m^2$. The first printing element board H3600 and the second printing element board H3601 are fixedly adhered to the first plate H1200 in which an ink supplying port H1201 is formed for supplying ink to the first printing element board H3600 and the second printing element board H3601.

Further, the second plate H1400 having an opening is fixedly adhered to the first plate H1200. The second plate H1400 holds the electric wiring board H1300 so that the electric wiring board H1300 is electrically connected to the first printing element board H3600 and the second printing element board H3601.

The electric wiring board H1300 issues an electric signal for ejecting ink from the respective nozzles formed in the first printing element board H3600 and the second printing element board H3601. The electric wiring board H1300 has the electric wiring corresponding to the first printing element board H3600 and the second printing element board H3601 and an external signal inputting terminal H1301 located at ends of the electric wiring, for receiving the electric signal from the main body of the printing apparatus. The external signal inputting terminal H1301 is located and fixed on the rear surface of the tank holder H1500.

On the other hand, the flow path forming member H1600 is fixed to the tank holder H1500 for holding the ink tank H1900, for example, by an ultrasonic welding. Thereby, an ink flow path H1501 extending from the ink tank H1900 to the first plate H1200 is formed.

At an ink tank side end of the ink flow path H1501 engaged with the ink tank H1900, the filter H1700 is provided. Thus, it is possible to prevent dust from invading from outside. Also, the seal rubber H1800 is mounted to a portion engaged with the ink tank H1900 to prevent the ink from evaporating from the engagement portion.

Further, the above-mentioned tank holder section composed of the tank holder H1500, the flow path forming member H1600, the filter H1700 and the seal rubber H1800 is coupled by the adhesion or others to the printing head H1001 composed of the first printing element board H3600, the second printing element board H36018 the first plate H1200, the electric wiring board H1300 and the second plate H1400. Thus, the head cartridge H1000 is constituted.

As described above, according to the present invention, since the probability of overlapping the particular color ink with other color ink on the printing medium is minimized as much as possible, it is possible to effectively facilitate the color development of the particular color ink.

The present invention has been described in detail with respect to preferred embodiments, and it will now be apparent from the foregoing to those skilled in the art that changes and modifications may be made without departing from the invention in its broader aspects, and it is the intention, therefore, that the appended claims cover all such changes and modifications as fall within the true spirit of the invention.

This application claims priority from Japanese Patent Application No. 2003-291875 filed Aug. 11, 2004, which is hereby incorporated by reference herein.

What is claimed is:

1. An ink-jet printing method for forming an image on a printing medium by using a printing head for ejecting a plurality of color inks including inks for basic colors including magenta, yellow and cyan and an ink of particular color having a hue different from that of the basic colors, comprising the steps of:

allocating a dot arrangement pattern to each pixel of the image according to a gradation level of each pixel; and ejecting the ink from the printing head to the printing medium based on the dot arrangement pattern allocated to each pixel, wherein the dot arrangement pattern allocated to a same pixel having a gradation level lower than a predetermined gradation level, for the particular color ink, is different from those for at least one color ink other than the particular color ink, and wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

2. An ink-jet printing method as defined by claim 1, wherein the dot arrangement pattern, corresponding to the gradation level lower than the predetermined gradation level, for the particular color ink, is different from those for all color inks other than the particular color ink.

3. An ink-jet printing method for forming an image on a printing medium by using basic color inks of magenta, yellow and cyan and a particular color ink having a hue different from those of the basic color inks, comprising the steps of:

allocating a dot arrangement pattern to each pixel of the image according to a gradation level of each pixel; and ejecting the ink from a printing head to the printing medium based on the dot arrangement pattern allocated to each pixel, wherein a dot arrangement pattern different from that for at least one color ink other than the particular color ink is used for the particular color ink in the allocation process, and wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

4. An ink-jet printing method as defined by claim 3, wherein the dot arrangement patterns for the two inks are different from the dot arrangement pattern for the particular color ink.

5. An ink-jet printing method as defined by claim 3, wherein the particular color ink is capable of representing a chroma higher than that of the color regeneration area.

6. An ink-jet printing method as defined by claim 3, wherein the particular color ink includes at least one of a red ink, a green ink and a blue ink.

7. An ink-jet printing method for forming an image on a printing medium by using a printing head for ejecting a plurality of color inks including inks for basic colors including magenta, yellow and cyan and an ink for a particular color having a hue different from that of the basic colors, comprising the steps of:

first quantizing for converting first multi-value data having a first gradation level to a second multi-value data having a second gradation level lower than the first gradation level;

second quantizing for converting the second multi-value data obtained by the first quantizing to binary data by using a dot arrangement pattern corresponding to the gradation level of the second multi-value data; and ejecting the ink to the printing medium from the printing head in accordance with the binary data obtained by the second quantizing, wherein in the second quantizing, a dot arrangement pattern different from those for at least one color ink other than the particular color ink is used for the particular color ink, and wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

8. An ink-jet printing method as defined by claim 7, wherein the dot arrangement pattern different from those for the other color inks is used for the particular color ink in the second quantizing.

9. An ink-jet printing apparatus for forming an image on a printing medium by using a printing head for ejecting a plurality of color inks including inks for basic colors including magenta, yellow and cyan and an ink for a particular color having a hue different from that of the basic colors, comprising:

means for allocating a dot arrangement pattern to each pixel of the image according to a gradation level of each pixel; and means for ejecting ink from the printing head to the printing medium based on the dot arrangement pattern allocated to each pixel, wherein the allocation means allocates the dot arrangement pattern for the particular color ink, different from that for at least one color ink other than the particular color ink, and wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

10. An ink-jet printing system for forming an image on a printing medium by using a printing head for ejecting a plurality of color inks including inks for basic colors including magenta, yellow and cyan and an ink for a particular color having a hue different from that of the basic colors, comprising:

first quantization means for converting first multi-value data having a first gradation level to second multi-value data having a second gradation level lower than the first gradation level;

second quantization means for converting the second multi-value data obtained by the first quantizing means to binary data by using a dot arrangement pattern corresponding to the gradation level of the second multi-value data; and means for ejecting the ink to the printing medium from the printing head in accordance with the binary data obtained by the second quantization means, wherein in the second quantization means, a dot arrangement pattern different from that for at least one color ink other than the particular color ink is used for the particular color ink, and wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

11. An ink-jet printing system as defined by claim 10, wherein the first quantization means is provided in a host computer and the second quantization means is provided in an ink-jet printing apparatus having the printing head and connected to the host computer.

12. An ink-jet printing method for forming an image having pixels on a printing medium by using a printing head for ejecting a plurality of color inks including inks for basic colors including magenta, yellow and cyan and an ink for a particular color having a hue different from that of the basic colors, comprising the steps of:
 allocating a dot arrangement pattern selected in a predetermined order or randomly from a plurality of different dot arrangement patterns corresponding to a same gradation level to each pixel having the same gradation level; and
 ejecting the ink from the printing head to the printing medium based on the dot arrangement pattern allocated to each pixel,
 wherein an allocation order of the plurality of different dot arrangement patterns, for the particular color ink, is different from that for at least one color ink other than the particular color ink, and
 wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

13. An ink-jet printing method for forming an image on a printing medium by using a printing head for ejecting a plurality of color inks including ink for basic colors including magenta, yellow and cyan and an ink for a particular color having a hue different from that of the basic colors, comprising the steps of:
 first quantizing for convening first multi-value data having a first gradation level to second multi-value data having a second gradation level lower than the first gradation level;
 second quantizing for converting the second multi-value data obtained by the first quantizing to binary data by using a dot arrangement pattern corresponding to the gradation level of the second multi-value data; and
 ejecting ink from the printing head to the printing medium in accordance with the binary data obtained by the second quantizing,
 wherein, in the second quantizing, a plurality of the dot arrangement patterns different from each other are used for a same gradation level of the second multi-value data in accordance with a predetermined arrangement rule, and one arrangement rule used for the particular color ink is different from that for at least one color ink other than the particular color ink, and
 wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

14. An ink-jet printing method for forming an image having pixels on a printing medium by using a printing head for ejecting a plurality of color inks including basic color inks of magenta, yellow and cyan and a particular color ink having a hue different from that of the basic color inks, comprising the steps of:
 allocating one dot arrangement pattern selected from a matrix formed by arranging a plurality of different dot arrangement patterns corresponding to a same gradation level to each pixel having the same gradation level; and
 ejecting the ink from the printing head to the printing medium based on the dot arrangement pattern allocated to the each pixel,
 wherein the arrangement of the dot arrangement patterns in the matrix for the particular color ink is different from the arrangement of the dot arrangement patterns in the matrix for at least one color ink other than the particular color ink, and
 wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

15. An ink-jet printing apparatus for forming an image having pixels on a printing medium by using a printing head for ejecting a plurality of color inks including basic color inks of magenta, yellow and cyan and a particular color ink, comprising:
 allocation means for allocating a dot arrangement pattern selected in a predetermined order or randomly from a plurality of different dot arrangement patterns corresponding to a same gradation level to each pixel having the same gradation level; and
 means for ejecting the ink from the printing head to the printing medium based on the dot arrangement pattern allocated to each pixel,
 wherein the allocation order of the plurality of different dot arrangement patterns for the particular color ink is different from that for at least one color ink other than the particular color ink, and
 wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

16. An ink-jet printing apparatus for forming an image having pixels on a printing medium by using a printing head for ejecting a plurality of color inks including basic color inks of magenta, yellow and cyan and a particular color ink having a hue different from that of the basic color inks, comprising:
 means for allocating one dot arrangement pattern selected from a matrix formed by arranging a plurality of different dot arrangement patterns corresponding to a same gradation level to each pixel having the same gradation level; and
 means for ejecting the ink from the printing head to the printing medium based on the dot arrangement pattern allocated to each pixel,
 wherein the arrangement of the dot arrangement patterns in the matrix for the particular color ink is different from the arrangement of the dot arrangement patterns in the matrix for at least one color ink other than the particular color ink, and
 wherein the particular color ink is capable of representing a lightness higher than that of a color regeneration area represented on the printing medium by a combination of two of the basic color inks of magenta, yellow and cyan, and has a hue in the color regeneration area represented by the combination of the two inks.

* * * * *

UNITED STATES PATENT AND TRADEMARK OFFICE
CERTIFICATE OF CORRECTION

PATENT NO. : 7,258,412 B2
APPLICATION NO. : 10/912191
DATED : August 21, 2007
INVENTOR(S) : Maru et al.

It is certified that error appears in the above-identified patent and that said Letters Patent is hereby corrected as shown below:

ON THE TITLE PAGE:
At item (57), Abstract, Line 3, "effect" should read --effects--.

COLUMN 1:
Line 9, "color, inks" should read --color inks.--.

COLUMN 2:
Line 17, "increases" should read --increase--.
Line 55, "columns" should read --column--.
Line 56, "And," should read --Also, disclosed is--.

COLUMN 3:
Line 8, "color-development" should read --color development--.

COLUMN 4:
Line 49, "used the" should read --use for the--.

COLUMN 5:
Line 22, "printing" should read --forming--.

COLUMN 7:
Line 7, "are" should read --is--.
Line 20, "of f" should read --of--.
Line 35, "correspond" should read --corresponds to--.

COLUMN 8:
Line 42, "color" should read --colors--.
Line 44, "color" should read --colors--.
Line 53, "dot" should read --dots--.
Line 61, "Next, in" should read --Next, the mask data conversion processing J0008 will be briefly explained below. In--.

COLUMN 9:
Line 47, "on" should read --on the--.

UNITED STATES PATENT AND TRADEMARK OFFICE
CERTIFICATE OF CORRECTION

PATENT NO. : 7,258,412 B2
APPLICATION NO. : 10/912191
DATED : August 21, 2007
INVENTOR(S) : Maru et al.

It is certified that error appears in the above-identified patent and that said Letters Patent is hereby corrected as shown below:

COLUMN 10:
Line 1, "of the is" should read --of the--.
Line 15, "not" should read --not be--.
Line 36, "therein" should read --therein.--.
Line 37, "the stress" should read --If the stress--, and "ink" should read --special ink--.

COLUMN 11:
Line 28, "colors." should read --color.--.
Line 58, "c and" should read --c and d--.

COLUMN 12:
Line 12, "the," should read --the--.

COLUMN 13:
Line 9, "other almost" should read --other and almost--.
Line 18, "pattern" should read --patterns--.
Line 63, "of inks" should read --of the inks--, and "are" should read --is--.

COLUMN 14:
Line 5, "other ink" should read --ink other--.
Line 19, "tution" should read --tution.--.

COLUMN 15:
Line 60, "color-ink." should read --color ink.--.

COLUMN 16:
Line 30, "apparatus" should read --apparatus.--.
Line 57, "M0101" should read --M1010--.

COLUMN 17:
Line 36, "cyan magenta," should read --cyan, magenta,--.
Line 51, "technique" should read --technique a--.

COLUMN 18:
Line 46, "H36018" should read --H3601,--.

UNITED STATES PATENT AND TRADEMARK OFFICE
CERTIFICATE OF CORRECTION

PATENT NO. : 7,258,412 B2
APPLICATION NO. : 10/912191
DATED : August 21, 2007
INVENTOR(S) : Maru et al.

It is certified that error appears in the above-identified patent and that said Letters Patent is hereby corrected as shown below:

COLUMN 22:
Line 6, "the" should be deleted.

Signed and Sealed this

Third Day of February, 2009

JOHN DOLL
*Acting Director of the United States Patent and Trademark Office*